US012748441B2

(12) United States Patent

Nishii et al.

(10) Patent No.: US 12,748,441 B2

(45) Date of Patent: Sep. 29, 2026

(54) AUTOMATIC TRAVEL METHOD, AUTOMATIC TRAVEL SYSTEM AND AUTOMATIC TRAVEL PROGRAM

(71) Applicant: Yanmar Holdings Co., Ltd., Osaka (JP)

(72) Inventors: Yasuto Nishii, Okayama (JP); Masaaki Murayama, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 84 days.

(21) Appl. No.: 18/902,996

(22) Filed: Oct. 1, 2024

(65) Prior Publication Data

US 2025/0130586 A1 Apr. 24, 2025

(30) Foreign Application Priority Data

Oct. 19, 2023 (JP) ................................ 2023-180088

(51) Int. Cl.

*G05D 1/648* (2024.01)
*A01B 69/04* (2006.01)
*G05D 105/15* (2024.01)
*G05D 107/20* (2024.01)

(52) U.S. Cl.

CPC ........... *G05D 1/648* (2024.01); *A01B 69/008* (2013.01); *G05D 2105/15* (2024.01); *G05D 2107/21* (2024.01)

(58) Field of Classification Search

CPC ............... G05D 1/648; G05D 2105/15; G05D 2107/21; G05D 2109/10; G05D 1/43; G05D 1/243; G05D 1/246; G05D 1/633; G05D 1/644; G05D 1/24; A01B 69/008; A01B 69/00

See application file for complete search history.

(56) References Cited

U.S. PATENT DOCUMENTS

| | | | | |
|---|---|---|---|---|
| 2017/0168490 | A1* | 6/2017 | Ishijima | G05D 1/0219 |
| 2019/0227561 | A1* | 7/2019 | Hiramatsu | A01B 69/008 |
| 2020/0331347 | A1* | 10/2020 | Sakaguchi | A01D 41/1217 |
| 2022/0304215 | A1* | 9/2022 | Shirafuji | A01B 69/008 |

FOREIGN PATENT DOCUMENTS

| | | | | |
|---|---|---|---|---|
| JP | 2022170850 A | 11/2022 | | |
| WO | WO-2020111102 A1 * | 6/2020 | | A01B 69/008 |

OTHER PUBLICATIONS

EPO machine translated description of WO-2020111102-A1. (Year: 2020).*

* cited by examiner

*Primary Examiner* — Navid Z. Mehdizadeh
*Assistant Examiner* — Shelley Marie Osterhout
(74) *Attorney, Agent, or Firm* — Chris Mizumoto

(57) ABSTRACT

A travel process causes a work vehicle to travel along a plurality of work paths which are included in a target path and which cause the work vehicle to perform predetermined work, and a plurality of turning paths connecting between the work paths. In a case where the work vehicle travels in the turning path, when a correction process decides that at least one of a predetermined positional displacement and a predetermined orientational displacement occurs with respect to a target start position of the work path which follows the turning path, it causes the work vehicle to perform correction travel including reverse travel.

12 Claims, 11 Drawing Sheets

AUTOMATIC TRAVEL METHOD, AUTOMATIC TRAVEL SYSTEM AND AUTOMATIC TRAVEL PROGRAM

CROSS-REFERENCE

This application claims foreign priority of JP2023-180088 filed Oct. 19, 2023, the disclosures of which are hereby incorporated by reference in its entirety.

TECHNICAL FIELD

The present invention relates to a technique to automatically travel a work vehicle along a target path.

BACKGROUND ART

Conventionally, a work vehicle which automatically travels in a field along a preset target path is known. For example, the work vehicle performs work while it reciprocates and travels in the inner area of the center portion of the field, and performs work while it orbits around and travels in the outer area (headland area) of the peripheral portion of the field (see Patent Document 1, for example). In addition, during work in the inner area, the work vehicle turns and travels in a turning path when it moves from one work path to the next work path.

PRIOR ART DOCUMENT

Patent Document

Patent Document 1: Japanese Patent Laid-Open No. 2018-147421

SUMMARY OF INVENTION

Technical Problem

Here, in a case where the work vehicle turns and travels in the turning path to enter the next work path, when the positional accuracy is low, the positional displacement (for example, lateral positional deviation), the orientational displacement (orientational deviation) and the like may occur with respect to the starting end (target start position) of that work path. When the work vehicle starts work with the occurrence of the positional displacement or the orientational displacement, work is not started from the appropriate position of the work path, resulting in an unworked area.

An object of the present invention is to provide an automatic travel method, an automatic travel program and an automatic travel system which allow a work vehicle to appropriately enter a work path which follows a turning path.

Solution to Problem

An automatic travel method according to the present invention is a method for causing a work vehicle to automatically travel along a preset target path, wherein the method performs: causing the work vehicle to travel along a plurality of work paths which are included in the target path and which cause the work vehicle to perform predetermined work, and a plurality of turning paths connecting between the work paths; and in a case where the work vehicle travels in the turning path, when it is decided that at least one of a predetermined positional displacement and a predetermined orientational displacement occurs with respect to a target start position of the work path which follows the turning path, causing the work vehicle to perform correction travel including reverse travel.

An automatic travel program according to the present invention is a program which causes a work vehicle to automatically travel along a preset target path, wherein the program causes one or more processors to perform: causing the work vehicle to travel along a plurality of work paths which are included in the target path and which cause the work vehicle to perform predetermined work, and a turning path connecting between the plurality of work paths; and in a case where the work vehicle travels in the turning path, when it is decided that at least one of a predetermined positional displacement and a predetermined orientational displacement occurs with respect to a target start position of the work path which follows the turning path, causing the work vehicle to perform correction travel including reverse travel.

An automatic travel system according to the present invention is a system for causing a work vehicle to automatically travel along a preset target path, wherein the system comprises a travel process part and a correction process part. The travel process part causes the work vehicle to travel along a plurality of work paths which are included in the target path and which cause the work vehicle to perform predetermined work, and a plurality of turning paths connecting between the work paths. In a case where the work vehicle travels in the turning path, when the correction process part decides that at least one of a predetermined positional displacement and a predetermined orientational displacement occurs with respect to a target start position of the work path which follows the turning path, it causes the work vehicle to perform correction travel including reverse travel.

Advantageous Effects of Invention

According to the present invention, an automatic travel method, an automatic travel program and an automatic travel system which allow a work vehicle to appropriately enter a work path which follows a turning path can be provided.

DESCRIPTION OF EMBODIMENTS

The following embodiment is an example embodying the present invention and is not limit to the technical scope of the present invention.

Figure 1:
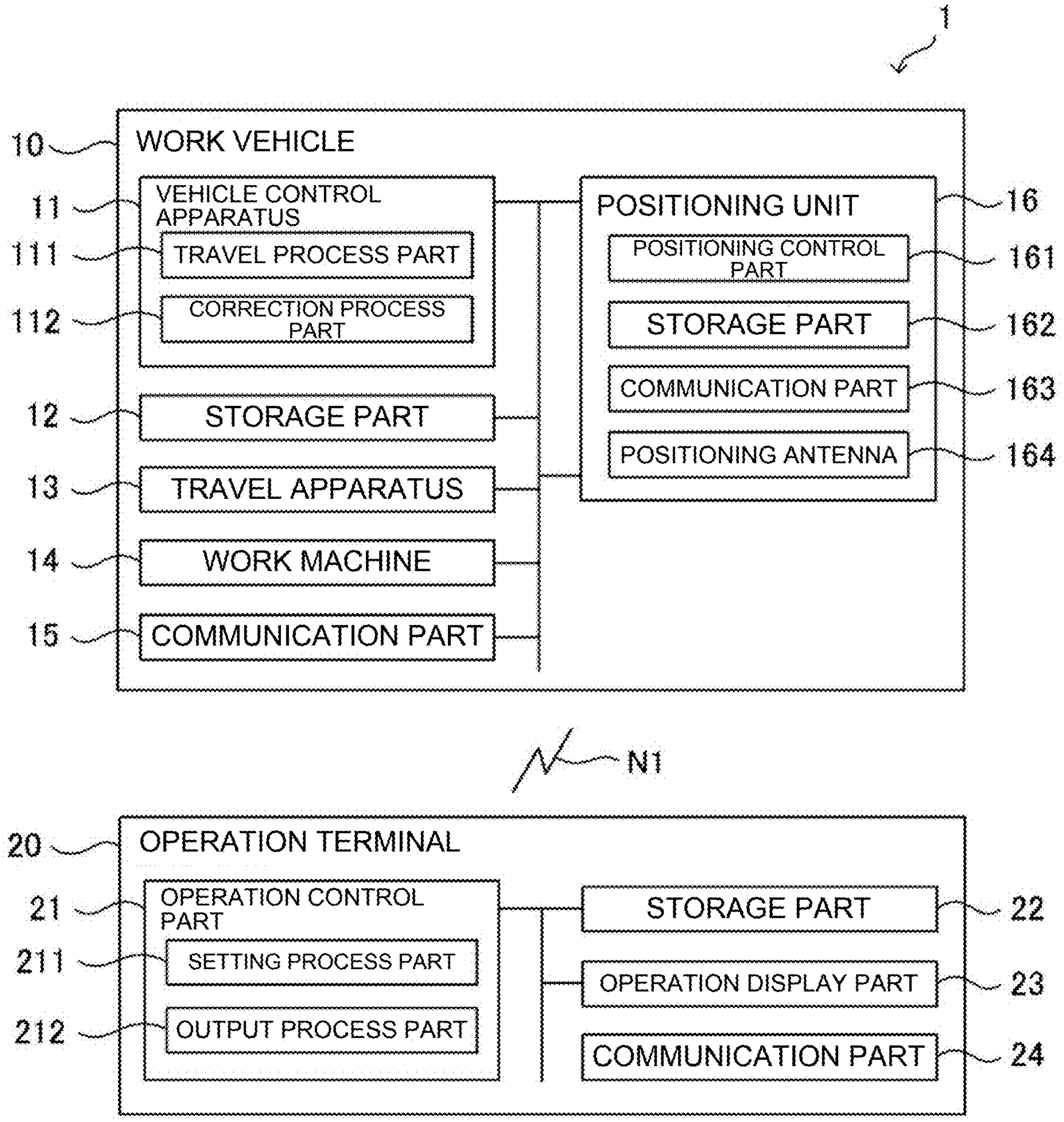
FIG. 1 is a block diagram illustrating a structure of an automatic travel system according to an embodiment of the present invention.

As shown in FIG. 1, an automatic travel system 1 according to an embodiment of the present invention includes a work vehicle 10 and an operation terminal 20. The work vehicle 10 and the operation terminal 20 can communicate via a communication network N1. For example, the work vehicle 10 and the operation terminal 20 can communicate via a mobile phone line network, a packet line network or a wireless LAN.

In this embodiment, an instance where the work vehicle 10 is a tractor will be described as an example. Meanwhile, as another embodiment, the work vehicle 10 may be a combine harvester, a rice transplanter, a construction machine, a snowplow or the like. The work vehicle 10 comprises a structure that can automatically travel along a preset target path R in a field F (see FIG. 3).

For example, a worker (operator) registers the field F as a work target and sets the target path R where the work vehicle 10 automatically travels with respect to the field F. The work vehicle 10 automatically travels along the preset target path R on the field F, based on positional information about the current position of the work vehicle 10, which is calculated from a positioning unit 16. In addition, the work vehicle 10 performs predetermined work while it automatically travels in the field F. The field F includes an inner area Fa which is an inside area and a peripheral area (headland area Fb) which is the surrounding area of the inner area Fa. In the inner area Fa, an inner work path Ra which is a travel path of the work vehicle 10 is set, and in the headland area Fb, a headland work path Rb which is a travel path of the work vehicle 10 is set.

Figure 3:
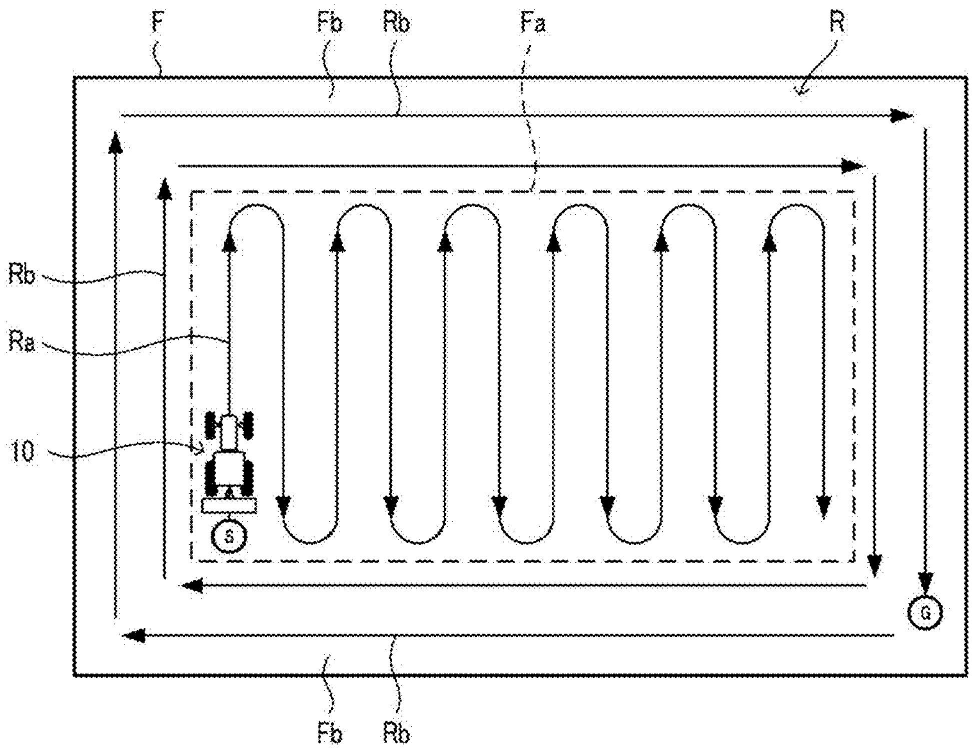
FIG. 3 is a view illustrating an example of a target path set in a field according to the embodiment of the present invention.

For example, in the inner area Fa of the field F shown in FIG. 3, the work vehicle 10 performs predetermined work while it reciprocates and travels in the inner work path Ra from a travel start position S in a parallel manner, and then, in the headland area Fb, performs predetermined work while it orbits around and travels in the headland work path Rb toward a travel end position G in a spiral manner. The target path R is not limited to the path shown in FIG. 3 and is appropriately set depending on descriptions to be worked. Further, in FIG. 3, there is a path where the work vehicle 10 first travels in the inner area Fa and then travels in the headland area Fb; however, the order in which the work vehicle 10 travels is not limited to this. For example, the work vehicle 10 may first travel in the headland area Fb and then travel in the inner area Fa.

The operation terminal 20 is a mobile terminal which can remotely operate the work vehicle 10, and is composed of a tablet terminal, a notebook personal computer, a smartphone and the like, for example. The worker can carry out operations for setting a variety of items set in the operation terminal 20. Also, information such as the work status and the travel status of the work vehicle 10 during automatic travel are displayed on the operation terminal 20. The worker can grasp the work status and the travel status in the operation terminal 20.

Figure 4:
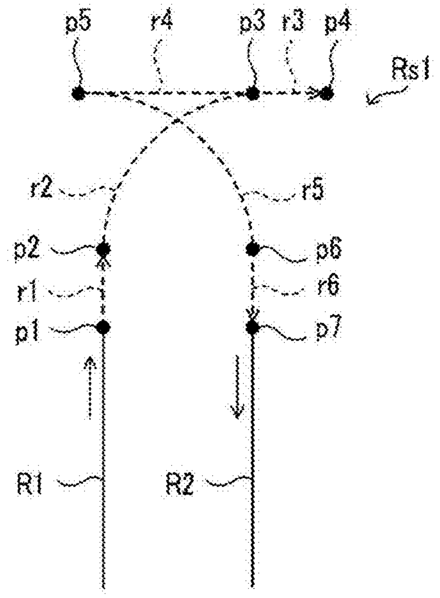
FIG. 4 is a view illustrating an example of a turning path included in the target path according to the embodiment of the present invention.

Here, when the work vehicle 10 completes work in one work path, it turns and travels in a turning path which is included in the target path R to aim at the next work path. In FIG. 4, an example of a turning path Rs1 is shown. In addition, in FIG. 4, work paths R1 and R2 which are set in the inner area Fa are shown. The work path R2 is a work path which is worked after the work path R1. The work path R1 and the work path R2 are connected by the turning path Rs1. When the work vehicle 10 completes work in the work path R1, it travels in the turning path Rs1 and enters the work path R2 to perform work in the work path R2.

In particular, the turning path Rs1 includes a straight path r1 connected to the work path R1, a turning path r2 connected to the straight path r1, a straight path r3 connected to the turning path r2, a straight path r4 connected to the straight path r3, a turning path r5 connected to the straight path r4, and a straight path r6 connected to the turning path r5 and the work path R2.

When the work vehicle 10 arrives at a terminating end p1 of the work path R1, it raises a work machine 14 to temporarily stop work, and travels straight in the straight path r1 in the forward direction. Then, when the work vehicle 10 arrives at a terminating end p2 of the straight path r1 (starting end of the turning path r2), it turns and travels in the turning path r2 in the forward direction. Subsequently, when the work vehicle 10 arrives at a terminating end p3 of the turning path r2 (starting end of the straight path r3), it travels straight in the straight path r3 in the forward direction. Next, when the work vehicle 10 arrives at a terminating end p4 of the straight path r3 (starting end of the straight path r4), it travels straight in the straight path r4 in the reverse direction. Then, when the work vehicle 10 arrives at a terminating end p5 of the straight path r4 (starting end of the turning path r5), it turns and travels in the turning path r5 in the forward direction. Subsequently, when the work vehicle 10 arrives at a terminating end p6 of the turning path r5 (starting end of the straight path r6), it travels straight in the straight path r6 in the forward direction.

Finally, when the work vehicle 10 arrives at a terminating end p7 of the straight path r6 (starting end of the work path R2), it lowers the work machine 14 and enters the work path R2 to resume work. Meanwhile, the position p7 is the starting end of the work path R2 and corresponds to the target start position of the work path R2.

Figure 5:
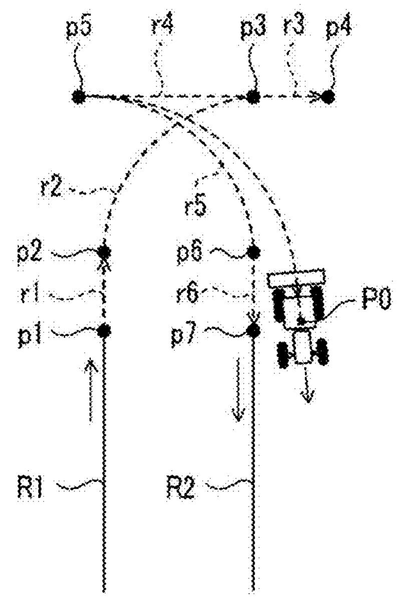
FIG. 5 is a view illustrating a state where turning travel in the inner area causes the occurrence of positional displacement and orientational displacement.

Here, in order for the work vehicle 10 to appropriately enter the work path R2, it is desired that the work vehicle 10 is located within a predetermined distance from the starting end of the work path R2 (target start position p7), and the vehicle orientation is within a predetermined orientation with respect to the extension direction of the work path R2 at the time when the work vehicle 10 finishes traveling in the turning path r5 and the straight path r6. However, due to impacts of the state of the field F (soil), the positional accuracy of the positioning unit 16 and the like, a current position P0 of the work vehicle 10 may be displaced laterally with respect to the target start position p7, and the vehicle orientation may be displaced with respect to the work path R2 at the time when the work vehicle 10 finishes traveling in the turning path r5 and the straight path r6, as shown in FIG. 5, for example. If such a positional displacement (positional deviation) or such an orientational displacement (orientational deviation) occurs, the work vehicle 10 will start work from a position displaced from the work path R2, resulting in an unworked area (clearance between worked areas).

On the other hand, the automatic travel system 1 according to this embodiment comprises a structure that allows the work vehicle 10 to appropriately enter a work path which follows a turning path, as indicated below.

[Work Vehicle 10]

Figure 2:
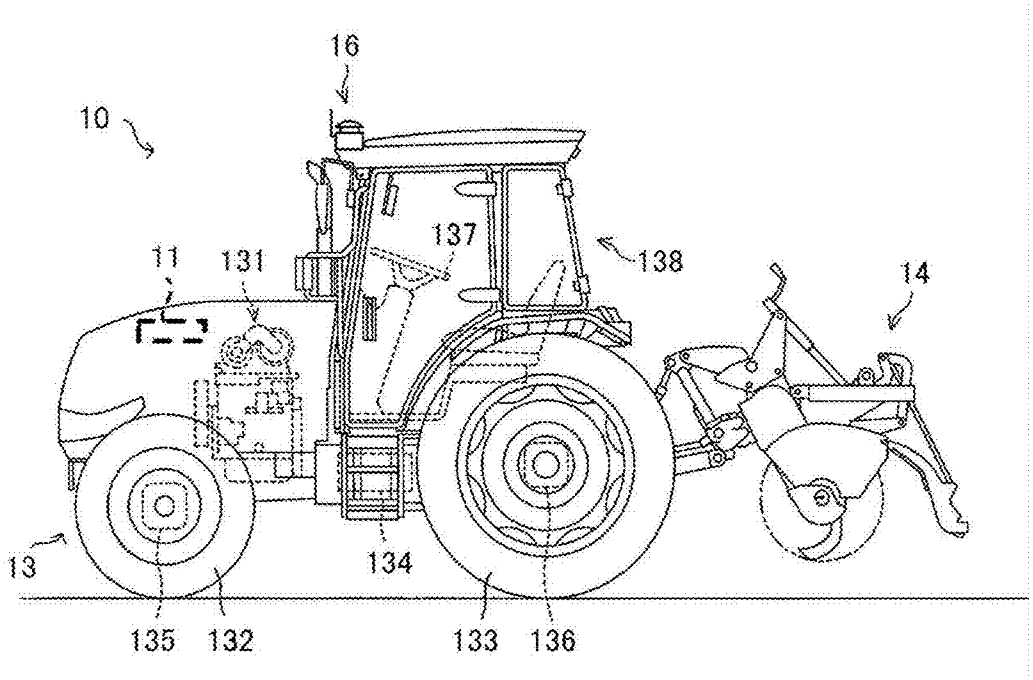
FIG. 2 is an external view illustrating a structure of a work vehicle according to the embodiment of the present invention.

As shown in FIG. 1 and FIG. 2, the work vehicle 10 comprises a vehicle control apparatus 11, a storage part 12, a travel apparatus 13, the work machine 14, a communication part 15, the positioning unit 16 and the like. The vehicle control apparatus 11 is electrically connected to the storage part 12, the travel apparatus 13, the work machine 14, the positioning unit 16 or the like. Meanwhile, the vehicle control apparatus 11 and the positioning unit 16 may communicate wirelessly.

The communication part 15 is a communication interface that connects the work vehicle 10 to the communication network N1 with or without wire, and executes data communication between the work vehicle 10 and external equipment (such as the operation terminal 20) through the communication network N1 in compliance with a predetermined protocol.

The storage part 12 is a non-volatile storage part for storing a variety of information such as an HDD (Hard Disk Drive) or an SSD (Solid State Drive). Control programs such as an automatic travel program that causes the vehicle control apparatus 11 to execute an automatic travel process described later (see FIG. 13 and FIG. 15) are stored in the storage part 12. For example, the automatic travel program is recorded in a computer-readable recording medium such as a CD or a DVD in a non-transitory manner, is read by a predetermined reader (not shown) and is stored in the storage part 12. Meanwhile the automatic travel program may be downloaded from a server (not shown) to the work vehicle 10 via the communication network N1 and be stored in the storage part 12. In addition, data on the target path R generated in the operation terminal 20 is stored in the storage part 12.

The travel apparatus 13 is a driving part which travels the work vehicle 10. As shown in FIG. 2, the travel apparatus 13 comprises an engine 131, front wheels 132, rear wheels 133, a transmission 134, a front axle 135, a rear axle 136, a steering wheel 137 and the like. Meanwhile, the front wheels 132 and the rear wheels 133 are respectively provided on the left and the right of the work vehicle 10. Moreover, the travel apparatus 13 is not limited to a wheel-type one which comprises the front wheels 132 and the rear wheels 133, and may be a crawler-type one which comprises crawlers provided on the left and the right of the work vehicle 10.

The engine 131 is a driving source such as a diesel engine or a gasoline engine which is driven with a fuel supplied to a fuel tank which is not shown. The travel apparatus 13 may comprise an electric motor as a driving source along with the engine 131 or instead of the engine 131. Meanwhile, a generator not shown is connected to the engine 131, and electric power is supplied from that generator to electrical components such as the vehicle control apparatus 11 and the positioning unit 16 provided in the work vehicle 10, batteries and the like. Meanwhile, the batteries are charged by electric power supplied from the generator. And the electrical components such as the vehicle control apparatus 11 and the positioning unit 16 provided in the work vehicle 10 can be driven by electric power supplied from the batteries even after the engine 131 is stopped.

The driving force of the engine 131 is transmitted to the front wheels 132 via the transmission 134 and the front axle 135, and is transmitted to the rear wheels 133 via the transmission 134 and the rear axle 136. Further, the driving force of the engine 131 is also transmitted to the work machine 14 via a PTO shaft (not shown). When the work vehicle 10 performs automatic travel, the travel apparatus 13 performs travel actions in accordance with instructions from the vehicle control apparatus 11. Moreover, the travel apparatus 13 travels the work vehicle at a reduced speed or stops the work vehicle 10 in accordance with instructions from the vehicle control apparatus 11.

The work machine 14 is a cultivator, a mower, a plow, a fertilizer, a sprayer (chemical sprayer), a puddling machine, a seeder or the like, for example, and can be removably mounted to the work vehicle 10. This allows the work vehicle 10 to perform a variety of work with each work machine 14. In FIG. 2, an instance where the work machine 14 is a cultivator is shown. For example, the work machine 14 is attached behind the work vehicle 10. In order for the work vehicle 10 to perform cultivation work, the work machine 14 is attached behind the work vehicle 10 and the work vehicle 10 travels in the field F.

The work machine 14 may be supported by a hoisting and lowering mechanism not shown in a hoistable and lowerable manner in the work vehicle 10. The vehicle control apparatus 11 can control the hoisting and lowering mechanism to hoist and lower the work machine 14. For example, when the work vehicle 10 travels straight in the inner area Fa and the headland area Fb of the field F in the forward direction, the vehicle control apparatus 11 lowers the work machine 14, and when it travels straight in the inner area Fa and the headland area Fb of the field F in the reverse direction and when it turns and travels, the vehicle control apparatus 11 hoists the work machine 14. In addition, the vehicle control apparatus 11 outputs to the work machine 14 a work stop command when the vehicle control apparatus 11 acquires a work stop instruction. For example, the vehicle control apparatus 11 acquires the stop instruction from the operation terminal 20 when the operator performs a stop instruction operation in the operation terminal 20. When the vehicle control apparatus 11 acquires the work stop instruction, it stops driving of the PTO shaft to stop work of the work machine 14.

The steering wheel 137 is an operation part which is operated by the worker or the vehicle control apparatus 11. For example, in the travel apparatus 13, in response to the operation of the steering wheel 137 by the vehicle control apparatus 11, angles of the front wheels 132 are changed by a hydraulic power steering mechanism not shown to change the travel direction of the work vehicle 10.

In addition, the travel apparatus 13 comprises a shift lever, an accelerator, a brake, etc., which are operated by the vehicle control apparatus 11 and are not shown, other than the steering wheel 137. Also, in the travel apparatus 13, in response to the operation of the shift lever by the vehicle control apparatus 11, the gear of the transmission 134 is switched to the forward gear or the reverse gear to switch the travel mode of the work vehicle 10 to the forward or reverse mode and the like. In addition, the vehicle control apparatus 11 operates the accelerator to control the speed of the engine 131. Further, the vehicle control apparatus 11 controls the brake to brake the front wheels 132 and the rear wheels 133 by using an electromagnetic brake.

The positioning unit 16 is communication equipment comprising a positioning control part 161, a storage part 162, a communication part 163 and a positioning antenna 164 (see FIG. 1) and the like. For example, the positioning unit 16 is provided on the upper part of a cabin 138 where the worker boards, as shown in FIG. 2. Moreover, the place for installing the positioning unit 16 is not limited to the cabin 138. In addition, the positioning control part 161, the storage part 162, the communication part 163 and the positioning antenna 164 of the positioning unit 16 may be arranged discretely in different positions in the work vehicle 10. Meanwhile, as described before, the batteries are connected to the positioning unit 16, and the positioning unit 16 can operate even when the engine 131 is stopped. Also, for example, a mobile phone terminal, a smartphone, a tablet terminal, a quantum compass or the like may be used as the positioning unit 16.

The positioning control part 161 is a computer system comprising one or more processors and a storage memory such as a non-volatile memory and a RAM. The storage part 162 is a non-volatile memory or the like for storing a program which causes the positioning control part 161 to execute a positioning process, and data such as positioning information and moving information. For example, the above program is non-transiently recorded in a computer-readable recording medium such as a CD or a DVD, read by a predetermined reader (not shown), and stored in the storage part 162. Meanwhile, the program may be downloaded from a server (not shown) to the positioning unit 16 via the communication network N1 and stored in the storage part 162.

The communication part 163 is a communication interface for connecting the positioning unit 16 to the communication network N1 with wired or wireless connection, and executing data communication between the positioning unit 16 and external equipment such as a base station server through the communication network N1 in compliance with a predetermined protocol.

The positioning antenna 164 is an antenna that receives radio waves (GNSS signals) which are transmitted from satellites.

The positioning control part 161 calculates the current position of the work vehicle 10 based on the GNSS signals received by the positioning antenna 164 from the satellites. For example, in a case where the work vehicle 10 automatically travels in the field F, when the positioning antenna 164 receives radio waves (transmission time, orbital information, etc.) transmitted from each of a plurality of satellites, the positioning control part 161 calculates the distance between the positioning antenna 164 and the respective satellites to calculate the current position (latitude and longitude) of the work vehicle 10 based on the calculated distance. In addition, the positioning control part 161 may perform positioning by a real-time kinematic method (RTK-GNSS positioning method (RTK method)) which utilizes correction information corresponding to a base station (reference station) near the work vehicle to calculate the current position of the work vehicle 10. As described above, the work vehicle 10 utilizes positioning information from the RTK method to perform automatic travel. Meanwhile, the current position of the work vehicle 10 may be the same position as the positioning position (for example, the position of the positioning antenna 164) or may be a position displaced from the positioning position. Meanwhile, the positioning control part 161 may utilize a quantum compass to calculate (position) the current position of the work vehicle 10.

The vehicle control apparatus 11 has control equipment such as a CPU, a ROM and a RAM. The CPU is a processor that executes various arithmetic processes. The ROM is a non-volatile storage part that previously stores control programs such as a BIOS and an OS to cause the CPU to execute various arithmetic processes. The RAM is a volatile or non-volatile storage part that stores various types of information, and is used as a temporary storage memory for various processes executed by the CPU. And the vehicle control apparatus 11 controls the work vehicle by causing the CPU to execute various control programs previously stored in the ROM or the storage part 12.

Specifically, as illustrated in FIG. 1, the vehicle control apparatus 11 includes various process parts such as a travel process part 111 and a correction process part 112. Meanwhile, the vehicle control apparatus 11 functions as the various process parts by causing the CPU to execute various processes in accordance with the automatic travel program. Further, some or all of the process parts may be composed of electronic circuits. Meanwhile, the automatic travel program may be a program that causes a plurality of processors to function as the process parts.

The travel process part 111 controls travel of the work vehicle 10. For example, when the travel mode of the work vehicle 10 is automatic travel (automatic travel mode), the travel process part 111 causes the work vehicle 10 to automatically travel based on positional information (positioning information) indicating the current position of the work vehicle 10 which is positioned by the positioning unit 16. For example, when the work vehicle 10 meets a condition for starting automatic travel and acquires a work start instruction from the worker, the travel process part 111 causes the work vehicle 10 to start traveling automatically based on the positioning information. Further, the travel process part 111 causes the work vehicle 10 to automatically travel from the travel start position S to the travel end position G along the target path R (see FIG. 3) previously created and preset in the operation terminal 20. For example, the travel process part 111 causes the work vehicle 10 to travel along a plurality of work paths which are included in the target path R and which cause the work vehicle 10 to perform predetermined work, and a plurality of turning paths which connect between the work paths.

Meanwhile, when the travel mode of the work vehicle 10 is manual travel (manual travel mode), the work vehicle 10 can manually travel based on the operation (manual steering) by the worker. For example, the travel process part 111 acquires operation information which corresponds to driving operations such as a steering wheel operation, a speed change operation, a travel direction switching operation and a braking operation by the worker, and causes the travel apparatus 13 to execute travel actions based on the operation information.

When the position of the work vehicle 10 is displaced beyond a predetermined range (allowable range) with respect to a target position, or when the orientation of the work vehicle 10 (vehicle orientation) is displaced beyond a predetermined range (allowable range) with respect to a target orientation, the correction process part 112 causes the work vehicle 10 to perform correction travel which corrects the positional displacement and the orientational displacement. In particular, in a case where the work vehicle 10 travels in a turning path, when the correction process part 112 decides that at least one of a predetermined positional displacement and a predetermined orientational displacement occurs with respect to the target start position of the work path which follows the turning path, the correction process part 112 causes the work vehicle 10 to perform correction travel including reverse travel. The correction process part 112 comprises a function to execute a decision process for deciding the positional displacement and the orientational displacement.

For example, in an example shown in FIG. 5, when the work vehicle 10 travels in the turning path r5 and the straight path r6, the correction process part 112 decides whether the distance between the current position P0 and the target start position p7 of the work path R2 is beyond a predetermined distance or not. In addition, when the work vehicle 10 travels in the turning path r5 and the straight path r6, the correction process part 112 decides whether the difference in orientation between the vehicle orientation in the current position P0 and the extension direction of the work path R2 is beyond a predetermined orientation or not.

Meanwhile, here, although the correction process part 112 performs the decision process at the time when the work vehicle 10 travels in the turning path r5 and the straight path r6, the correction process part 112 may perform the decision process before the work vehicle 10 travels in the turning path r5 and the straight path r6, as another embodiment. For example, at the time when the work vehicle 10 arrives at a starting end p5 of the turning path r5, assuming that the work vehicle 10 travels in the turning path r5 and the straight path r6, the correction process part 112 decides whether the distance between a predicted arriving position P0 and the target start position p7 is beyond a predetermined distance or not; and assuming that the work vehicle 10 travels in the turning path r5 and the straight path r6, the correction process part 112 decides whether the difference in orientation in the predicted arriving position P0 is beyond a predetermined orientation with respect to the extension direction of the work path R2 or not.

Further, as another embodiment, the correction process part 112 may execute the decision process at the time when the work vehicle 10 starts traveling automatically. Moreover, as another embodiment, the correction process part 112 may execute the decision process while the work vehicle 10 travels in the turning path r5 or the straight path r6. In addition, the correction process part 112 may execute the decision processes respectively before the work vehicle 10 travels in the turning path r5 and the straight path r6, and at the time when the work vehicle 10 travels in the turning path r5 and the straight path r6. In this case, the correction process part 112 may set a decision threshold (the predetermined distance and the predetermined orientation) at different values in each decision timing.

Figure 6A:
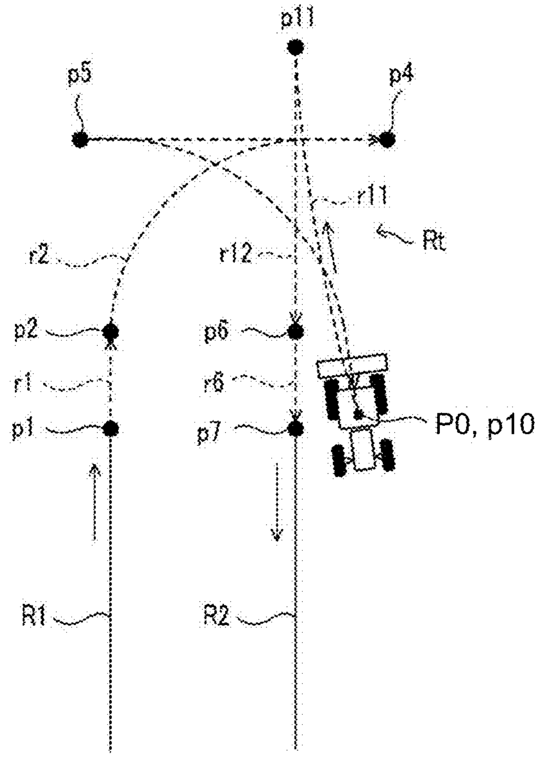
FIG. 6A is a view illustrating an example of correction travel according to the embodiment of the present invention.

Thus, in a case where the work vehicle 10 travels in a turning path, the correction process part 112 decides whether at least one of a predetermined positional displacement and a predetermined orientational displacement occurs or not. When the correction process part 112 decides that at least one of a predetermined positional displacement and a predetermined orientational displacement occurs in the decision process, the correction process part 112 creates a correction travel path (correction path Rt). The correction path Rt includes at least a reverse path for reverse travel. For example, as shown in FIG. 6A, the correction process part 112 creates the correction path Rt including the reverse path (turning path r11) from the current position P0 (position p10) to a position p11 which is on the extension line of the work path R2, and a straight path r12 from the position p11 to a starting end p6 of the straight path r6. The correction process part 112 causes the work vehicle 10 to automatically travel (correctively travel) in the correction path Rt. Specifically, the correction process part 112 causes the work vehicle 10 to turn and travel in the turning path r11 from the current position P0 in the reverse direction (see FIG. 6A), and when the work vehicle 10 arrives at the position p11 (see FIG. 6B), causes the work vehicle 10 to travel straight in the straight path r12 in the forward direction. Meanwhile, the correction process part 112 may switch turning travel to straight travel when the work vehicle 10 arrives in a predetermined range from the position p11.

In this way, when the correction process part 112 decides that the positional displacement occurs, it causes the work vehicle 10 to correctively travel so that the distance (positional displacement) from the target start position p7 of the work path R2 to the position of the work vehicle 10 is equal to or below a predetermined distance. In addition, when the correction process part 112 decides that the orientational displacement occurs, it causes the work vehicle 10 to correctively travel so that the orientational displacement of the work vehicle 10 is equal to or below a predetermined orientation with respect to the extension direction of the work path R2. Moreover, after causing the work vehicle 10 to correctively travel, the correction process part 112 causes the work vehicle 10 to travel forward toward the target start position p7 in the straight advancing direction. As a result of this, the work vehicle 10 can enter the work path R2 in a straight state.

Thus, when the correction process part 112 decides that at least one of a predetermined positional displacement and a predetermined orientational displacement occurs, it creates the correction path Rt which is different from the preset target path R to cause the work vehicle 10 to automatically travel (correctively travel) along the correction path Rt so that the positional displacement and the orientational displacement are inhibited.

Here, in the correction travel, it is desired that the correction process part 112 causes the work vehicle 10 to travel in reverse travel so that the positional displacement and the orientational displacement fall within a predetermined range. For example, in FIG. 6B, it is desired that the work vehicle 10 is located on the extension line of the work path R2, and the vehicle orientation coincides with the extension direction of the work path R2 at the time when the work vehicle 10 arrives at the position p11. For this reason, the correction process part 112 may set the terminating end (position p11) of the reverse travel path (turning path r11) near the end of the field F, as shown in FIG. 7. Meanwhile, a distance L1 shown in FIG. 7 is the shortest distance on account of a safety margin to prevent the work vehicle 10 from running off the field. According to the above arrangement, as the long reverse travel (turning path r11) distance can be ensured, the positional displacement and the orientational displacement are easily corrected by reverse travel, allowing the positional displacement and the orientational displacement to be reliably fallen within a predetermined range in the position p11.

Meanwhile, as another embodiment, in reverse travel, the correction process part 112 may complete reverse travel in a further front position than the set position p11 at the time when the positional displacement and the orientational displacement fall within a predetermined range, and then switch reverse travel to forward travel (straight travel). Further, as another embodiment, while the correction process part 112 corrects the positional displacement and the orientational displacement in reverse travel, it may also correct the positional displacement and the orientational displacement in forward travel subsequent to reverse travel.

Figure 8:
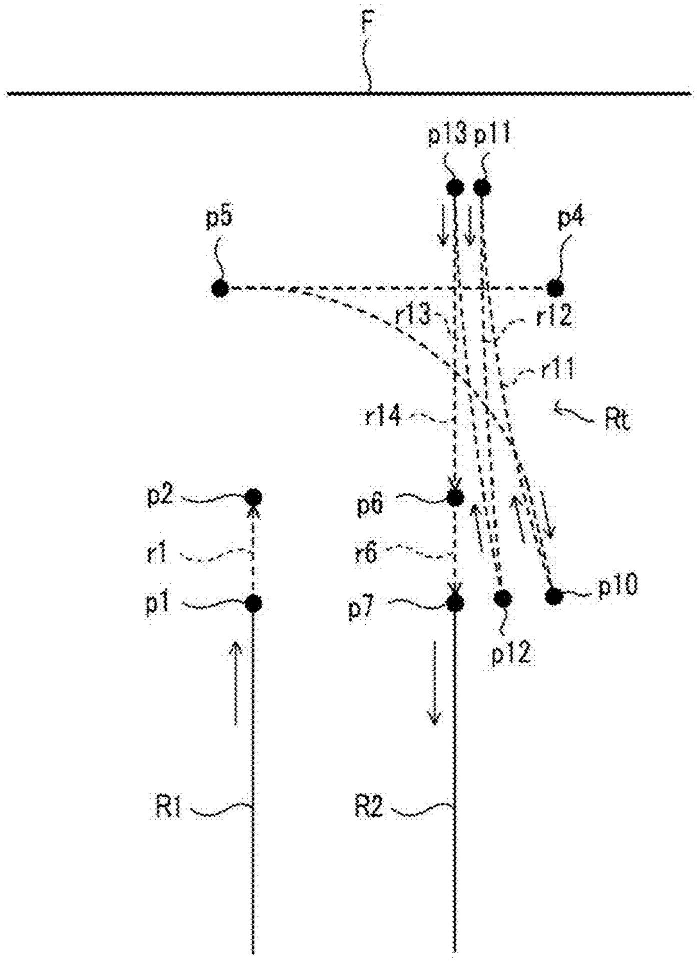
FIG. 8 is a view illustrating another example of correction travel according to the embodiment of the present invention.

Moreover, as another embodiment, when the headland area Fb is narrow, for example, the correction process part 112 may repeatedly perform the correction travel multiple times. For example, as shown in FIG. 8, when the work vehicle 10 travels in the turning path r11 from the position p10 in reverse and travels forward in the straight path r12 at the position p11, and at least one of the positional displacement and the orientational displacement is still beyond a predetermined range at a position p12, the correction process part 112 causes the work vehicle 10 to perform correction travel again. In particular, the correction process part 112 causes the work vehicle 10 to travel in a turning path r13 from the position p12 in reverse, switches reverse travel to forward travel at a position p13, and causes the work vehicle 10 to travel forward in a straight path r14. The correction process part 112 causes the work vehicle 10 to perform correction travel repeatedly until the positional displacement and the orientational displacement after the correction travel fall within a predetermined range with respect to the target start position p7.

In addition, as another embodiment, in the correction travel, when the work vehicle 10 travels in reverse, the vehicle control apparatus 11 may receive from the worker an operation for selecting whether or not to permit a part of the body to run off a boundary where the safety margin is taken into account, or the end (outline) of the field F. For example, the worker may perform the selection operation when he/she creates the target path R, or may perform the selection operation while the work vehicle 10 automatically travels. Meanwhile, even when the worker performs a setting that permits the work vehicle 10 to run off, it is desired that wheels of the work vehicle 10 does not run off the field F (does not override a ridge, for example). Further, when the worker performs the setting that permits the work vehicle 10 to run off, the vehicle control apparatus 11 may control travel of the work vehicle 10 so that it ignores the boundary or the end of the field F. Alternatively, when the operation control part 21 creates the target path R, it may automatically extend the safety margin to the outside of the field F, or may urge the worker to extend the safety margin. For example, the worker may input a distance from the ridge to the boundary (width of the safety margin) in a setting screen.

In addition, whether running-off is permitted in each side of outline sides of the field F or not may be selected, or when the outside of the field F is a side which corresponds to a dangerous position such as a roadway, a setting that solely and compulsory prohibits the work vehicle from running off that side may be made (for example, a path that does not cause a part of the body of the work vehicle 10 to run off may be created). Moreover, in a case where a path that a part of the body of the work vehicle 10 runs off is created, when the work vehicle 10 travels in a position which corresponds to the running-off path, the worker may cause the work vehicle 10 to travel manually. Further, even in the situation that compulsorily prohibits the work vehicle 10 from running off, when the work vehicle 10 is in a manned automatic travel mode that conditions the worker to board the work vehicle 10, the work vehicle 10 may automatically travels based on the running-off path.

In addition, also for usual turning travel (such as a U-turn and a fish-tail turn) in the headland, the selection and the setting of running-off may be made to create a path for turning travel in the headland, in a similar manner as that described above.

Figure 9:
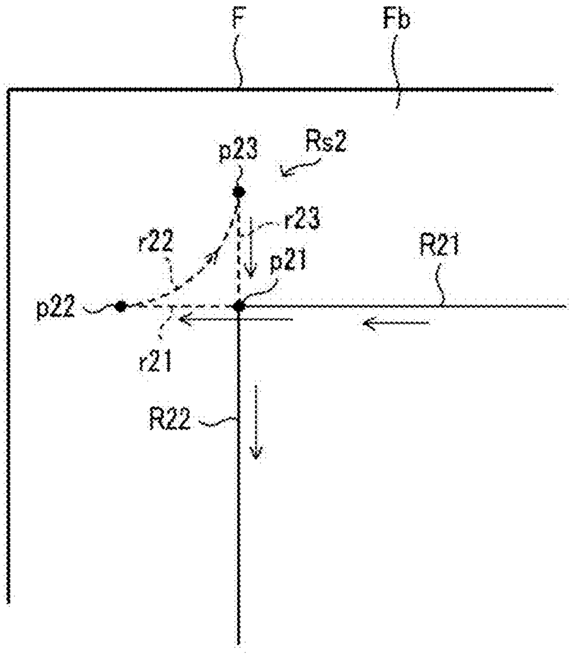
FIG. 9 is a view illustrating an example of the turning path included in the target path according to the embodiment of the present invention.

In the aforementioned example, correction travel of the inner area Fa has been explained; however, the same applies to the headland area Fb. In FIG. 9, work paths R21, R22 and a turning path Rs2 set in the headland area Fb are shown. The work path R22 is a work path to be worked subsequent to the work path R21. The work path R21 and the work path R22 are connected by the turning path Rs2. When the work vehicle 10 completes work in the work path R21, it travels in the turning path Rs2 and enters the work path R22 to perform work in the work path R22.

Specifically, the turning path Rs2 includes a straight path r21 connected to the work path R21, a turning path r22 connected to the straight path r21, and a straight path r23 connected to the turning path r22.

When the work vehicle 10 arrives at a terminating end p21 of the work path R21, it hoists the work machine 14 to stop work temporarily, and travels straight in the straight path r21 in the forward direction. Then, when the work vehicle 10 arrives at a terminating end p22 of the straight path r21 (starting end of the turning path r22), it turns and travels in the turning path r22 in the reverse direction. Subsequently, when the work vehicle 10 arrives at a terminating end p23 of the turning path r22 (starting end of the straight path r23), it travels straight in the straight path r23 in the forward direction. And then, when the work vehicle 10 arrives at the terminating end of the straight path r23 (starting end of the work path R22), it lowers the work machine 14 and enters the work path R22 to resume work. Meanwhile, a position p21 is the starting end of the work path R22, and corresponds to the target start position of the work path R22.

Figure 10:
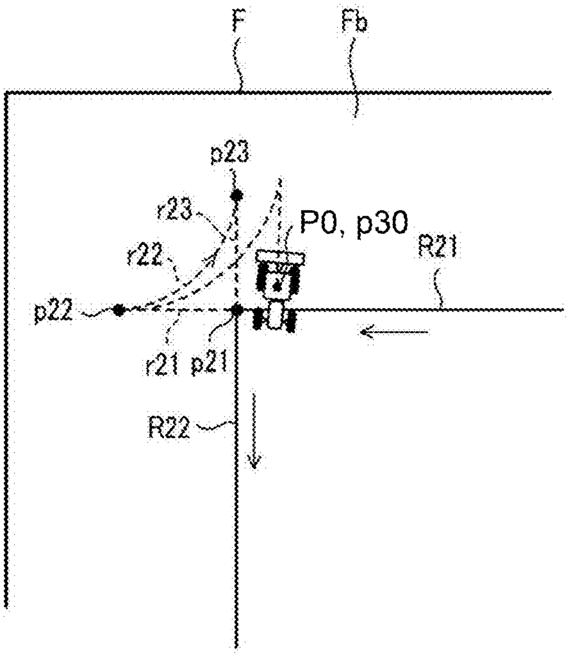
FIG. 10 is a view illustrating a state where turning travel in the headland area causes the occurrence of positional displacement and orientational displacement.

Here, in order for the work vehicle 10 to appropriately enter the work path R22, it is desired that the work vehicle 10 is located within a predetermined distance from the starting end of the work path R22 (target start position p21) and the vehicle orientation is within a predetermined orientation with respect to the extension direction of the work path R22 at the time when the work vehicle 10 completes traveling in the turning path r22 and the straight path r23. However, as shown in FIG. 10, for example, due to effects of the state of the field F (ground), the positional accuracy of the positioning unit 16, etc., the current position P0 of the work vehicle 10 may be laterally displaced with respect to the target start position p21, or the vehicle orientation may be displaced with respect to the extension direction of the work path R22 at the time when the work vehicle 10 completes traveling in the turning path r22 and the straight path r23, resulting in an unworked area because the work vehicle 10 starts work from a displaced position with respect to the work path R2, as in the inner area Fa.

Figure 11:
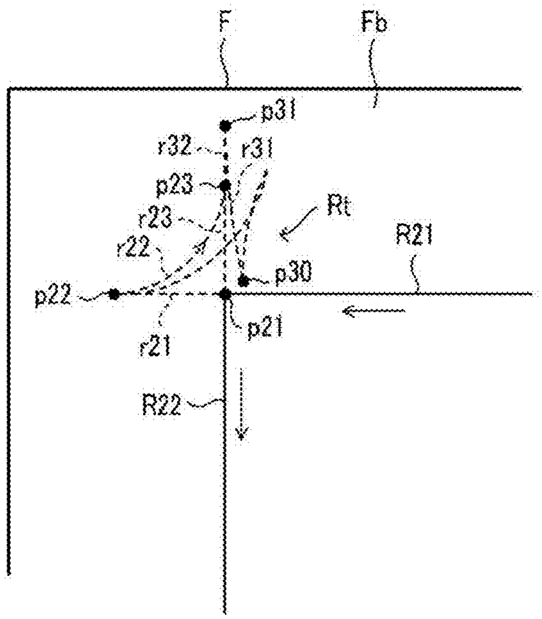
FIG. 11 is a view illustrating an example of correction travel according to the embodiment of the present invention.

As a consequence, also in the headland area Fb, when the work vehicle travels in the turning path, the correction process part 112 decides whether at least one of a predetermined positional displacement and a predetermined orientational displacement occurs or not, and when it decides that at least one of a predetermined positional displacement and a predetermined orientational displacement occurs, it creates a correction path to correct the positional displacement and the orientational displacement, and causes the work vehicle 10 to perform correction travel. For example, as shown in FIG. 11, the correction process part 112 creates the correction path Rt including a turning path r31 from the current position P0 (position p30) to a position p31 which is on the extension line of the work path R22, and a straight path r32 from the position p31 to the starting end p23 of the straight path r23. The correction process part 112 causes the work vehicle 10 to automatically travel (correctively travel) in the correction path Rt. In particular, the correction process part 112 causes the work vehicle 10 to turn and travel in the turning path r31 from the current position P0 in the reverse direction, and when the work vehicle 10 arrives at the position p31, causes it to travel straight in the straight path r32 in the forward direction. Meanwhile, the correction process part 112 may switch turning travel to straight travel when the work vehicle 10 arrives in a predetermined range (predetermined accuracy) from the position p31. In this way, the correction process part 112 causes the work vehicle 10 to correctively travel so that the distance from the target start position p21 of the work path R22 to the position of the work vehicle 10 is equal to or below a predetermined distance, and so that the orientation of the work vehicle 10 is equal to or below a predetermined orientation with respect to the extension direction of the work path R22.

Moreover, after causing the work vehicle 10 to correctively travel, the correction process part 112 causes it to travel straight toward the target start position p21 in the straight advancing direction. This allows the work vehicle 10 to enter the work path R22 in a straight state.

Meanwhile, also in the headland area Fb, the correction process part 112 may set the terminating end (position p31) of the reverse travel path (turning path r31) near the end of the field F. Moreover, the correction process part 112 may complete reverse travel at the time when the positional displacement and the orientational displacement fall within a predetermined range in a further front position than the set position p31, and switch reverse travel to forward travel (straight travel). Further, the correction process part 112 may repeatedly perform the correction travel multiple times.

[Operation Terminal 20]

As shown in FIG. 1, the operation terminal 20 is an information processing apparatus comprising the operation control part 21, a storage part 22, an operation display part 23, a communication part 24 and the like. The operation terminal 20 may be composed of a mobile terminal such as a tablet terminal and a smartphone.

The communication part 24 is a communication interface that connects the operation terminal 20 to the communication network N1 with wired or wireless connection, and executes data communication between the operation terminal 20 and external equipment such as one or more work vehicles 10 via the communication network N1 in compliance with a predetermined protocol.

The operation display part 23 is a user interface comprising a display part such as a liquid crystal display or an organic EL display which displays various kinds of information, and an operation part such as a touch panel, a mouse or a keyboard which receives operations. The worker can operate the operation part to perform a registration operation of various kinds of information (such as work vehicle information, field information, work information described later) in an operation screen displayed in the display part. In addition, the worker can operate the operation part to perform a work start instruction, a travel stop instruction and the like with respect to the work vehicle 10. Further, in a place remote from the work vehicle 10, the worker can grasp the travel state of the work vehicle 10 which automatically travels along the target path R in the field F, by means of travel trajectories displayed in the operation terminal 20 and images captured by a camera.

The storage part 22 is a non-volatile storage part such as an HDD or an SSD which stores various types of information. The storage part 22 stores control programs to cause the operation control part 21 to execute various control processes. For example, the control programs are non-transiently recorded in a computer-readable recording medium such as a CD or a DVD, and they are read by a predetermined reader (not shown) and are stored in the storage part 22. Meanwhile, the control programs may be downloaded from a server (not shown) via the communication network N1 to the operation terminal 20, and be stored in the storage part 22.

The operation control part 21 has control equipment such as a CPU, a ROM and a RAM. The CPU is a processor that executes various arithmetic processes. The ROM is a non-volatile storage part that previously stores control programs such as a BIOS and an OS to cause the CPU to execute various arithmetic processes. The RAM is a volatile or non-volatile storage part which stores various types of information and is used as a transient storage memory (work region) for various processes executed by the CPU. And the operation control part 21 controls the operation terminal 20 by causing the CPU to execute various programs which are previously stored in the ROM or the storage part 22.

As shown in FIG. 1, the operation control part 21 includes various process parts such as a setting process part 211 and an output process part 212. Meanwhile, the operation control part 21 functions as the various process parts by causing the CPU to execute various processes according to the control programs. Further, some or all of the process parts may be composed of electronic circuits. Meanwhile, the control programs may be programs that cause a plurality of processors to function as the process parts.

The setting process part 211 sets various types of setting information for causing the work vehicle 10 to perform automatic travel. Specifically, the setting process part 211 sets information about the work vehicle 10 (hereinafter, referred to as work vehicle information). The setting process part 211 sets information such as the type (model) of the work vehicle 10, the position to which the positioning antenna 164 is attached in the work vehicle 10, the type of the work machine 14, the size and the shape of the work machine 14, the position of the work machine 14 with respect to the work vehicle 10, the vehicle speed and the engine speed of the work vehicle 10 during work, and the vehicle speed and the engine speed of the work vehicle 10 during turning, such information being set by the worker performing a registration operation in the operation terminal 20.

Figure 12:
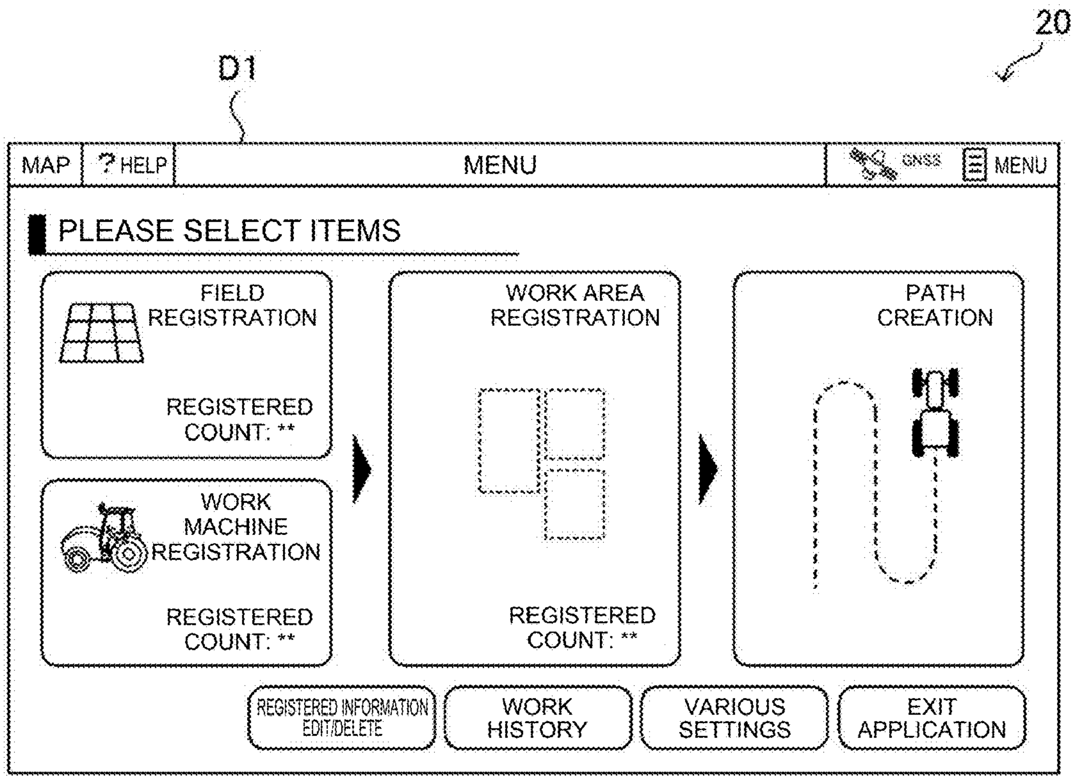
FIG. 12 is a view illustrating an example of a menu screen displayed on an operation terminal according to the embodiment of the present invention.

For example, the setting process part 211 causes the operation display part 23 to display a menu screen D1 as shown in FIG. 12. The worker selects "Work machine registration" on the menu screen D1 to register work machine information about the work machine 14, for example.

In addition, the setting process part 211 sets information about the field F (hereinafter, referred to as field information). The setting process part 211 sets information such as the position and the shape of the field F, the travel start position S at which work starts and the travel end position G at which work ends (see FIG. 3), and the work direction, such information being set by the worker performing a registration operation in the operation terminal 20. Meanwhile, the work direction means a direction in which the work vehicle 10 travels while work is performed by the work machine 14 in a work area where an unworked area is excluded from the field F. For example, the worker selects "Field registration" on the menu screen D1 to register field information.

Information about the position and the shape of the field F can be automatically acquired by the worker who boards and drives the work vehicle 10 so as to orbit around the periphery of the field F by a lap to register the change in positional information about the positioning antenna 164 at that time, for example. In addition, the position and the shape of the field F can also be acquired based on a polygon obtained by the worker who operates the operation terminal 20 to specify a plurality of points on a map while the map is displayed on the operation terminal 20. The area specified by the position and the shape of the field F thus acquired is an area (travel area) where the work vehicle 10 can travel.

Moreover, the setting process part 211 sets information about how work is specifically performed (hereinafter, referred to as work information). The setting process part 211 can be configured to set, as work information, the presence or absence of cooperative work between the unmanned work vehicle 10 and the manned work vehicle 10, the number of skips which is the number of work paths skipped by the work vehicle when it turns in the headland, the width of the headland, the width of the uncultivated land and the like. For example, the worker selects "Work registration" on the menu screen D1 to register work information.

Further, the setting process part 211 creates the target path R which is a path causing the work vehicle 10 to automatically travel, based on each of the set information. The target path R is a work path from the travel start position S to the travel end position G, for example (see FIG. 3). The target path R shown in FIG. 3 includes the work path of the straight path where the work vehicle 10 reciprocates and travels in a parallel manner in the inner area Fa of the field F, and the turning path connecting between the work paths, and includes the work path of the straight path where the work vehicle 10 orbits around and travels in the headland area Fb, and the turning path connecting between the work paths. The setting process part 211 creates and stores the target path R of the work vehicle 10 based on each of the set information. For example, the worker selects "Path creation" on the menu screen D1 to provide an instruction to create the target path R. Meanwhile, the setting process part 211 can create and store a plurality of the target paths R depending on descriptions to be worked with respect to the single field F.

The output process part 212 outputs the path data on the target path R to the work vehicle 10. For example, when the worker selects the desired target path R on the operation screen to provide a work start instruction, the output process part 212 outputs the path data on the selected target path R to the work vehicle 10.

The work vehicle 10 can be configured to autonomously travel along the target path R while the path data on the target path R created in the operation terminal 20 is transferred to the work vehicle 10 and is stored in the storage part 12, and the current position of the work vehicle 10 is detected by the positioning antenna 164.

Meanwhile, the current position of the work vehicle 10 usually coincides with the position of the positioning antenna 164.

In a case where a predetermined start condition is met, when the work start instruction is provided to the work vehicle 10 by the worker pressing a work start button on the operation screen, the travel process part 111 causes the work vehicle 10 to start automatic travel to start work by the work machine 14 (see FIG. 2). For example, on the conditions that the current position of the work vehicle 10 is within a predetermined distance from the travel start position S, and the vehicle orientation is within a predetermined orientation, the operation control part 21 permits the work vehicle 10 to automatically travel. Meanwhile, the start condition that permits the work vehicle 10 to automatically travel is not limited to the above conditions.

The travel process part 111 of the work vehicle 10 causes the work vehicle 10 to automatically travel from the travel start position S to the travel end position G along the target path R acquired from the operation terminal 20.

In addition, when the operation control part 21 acquires a detection result indicating that an obstruction has been detected from the work vehicle 10, the operation terminal 20 may display the position at which the obstruction has been detected on the captured image which is captured by a camera.

Meanwhile, the operation terminal 20 may be accessible to a website of an agricultural support service (agricultural support site) provided by the server (not shown) via the communication network N1. In this case, because a browser program is executed by the operation control part 21, the operation terminal 20 can function as an operation terminal for the server. And the server comprises the above respective process parts to execute respective processes.

[Automatic Travel Process]

In the following, an example of the automatic travel process performed by the automatic travel system 1 will be explained with reference to FIG. 13.

Meanwhile, the present invention can be interpreted as an invention of an automatic travel method for executing one or more steps contained in the automatic travel process. In addition, one or more steps described here and contained in the automatic travel process may be omitted as appropriate. Meanwhile, respective steps in the automatic travel process may be executed in different order within a range of the same effects being produced. Moreover, although an instance where the vehicle control apparatus 11 executes respective steps in the automatic travel process is explained here as an example, an automatic travel method in which one or more processors discretely execute respective steps in the automatic travel process is also conceived as another embodiment.

In Step S1, the vehicle control apparatus 11 decides whether the work vehicle 10 is ready for automatic travel or not. When the automatic travel start condition is met by the work vehicle 10 (S1: Yes), the vehicle control apparatus 11 moves the process to Step S2. The vehicle control apparatus 11 waits until the automatic travel start condition is met by the work vehicle 10 (S1: No).

In Step S2, the vehicle control apparatus 11 causes the work vehicle 10 to start automatic travel.

For example, when the worker provides the work start instruction on the operation screen of the operation terminal 20, the operation control part 21 outputs the work start instruction to the work vehicle 10. When the vehicle control apparatus 11 acquires the work start instruction from the operation terminal 20, it causes the work vehicle 10 to start automatic travel. As a result of this, the work vehicle 10 starts automatic travel along the target path R (see FIG. 3) in the field F, and starts work with the work machine 14.

In Step S3, the vehicle control apparatus 11 decides whether at least one of a predetermined positional displacement and a predetermined orientational displacement of the work vehicle 10 occurs with respect to the target start position or not. For example, the vehicle control apparatus 11 decides whether the displacement of the work vehicle 10 (positional displacement) is beyond a predetermined range with respect to the target start position which is the starting end of a work path, and decides whether the displacement of the vehicle orientation of the work vehicle 10 (orientational displacement) in that work path is beyond a predetermined range with respect to the extension direction in the target start position or not. The vehicle control apparatus 11 executes the decision process for the starting end (target start position) of each work path in the inner area Fa and the headland area Fb.

Meanwhile, the vehicle control apparatus 11 may execute the decision process based on the positional relationship between the current position when the work vehicle 10 actually travels toward the work path and the target start position, or may execute the decision process based on the positional relationship between the predicted arriving position and the target start position before the work vehicle 10 travels toward the work path.

When the vehicle control apparatus 11 decides that at least one of a predetermined positional displacement and a predetermined orientational displacement of the work vehicle 10 occurs with respect to the target start position, in other words, when it decides that at least one of the positional displacement and the orientational displacement is beyond a predetermined range (S3: Yes), it moves the process to Step S4. On the other hand, when the vehicle control apparatus 11 decides that a predetermined positional displacement and a predetermined orientational displacement of the work vehicle 10 do not occur with respect to the target start position, in other words, when it determines that both the positional displacement and the orientational displacement are within a predetermined range (S3: No), it moves the process to Step S7.

In Step S4, the vehicle control apparatus 11 creates the correction path Rt to correct the positional displacement and the orientational displacement. When the vehicle control apparatus 11 detects the positional displacement only, it creates the correction path Rt to correct the positional displacement, when it detects the orientational displacement only, it creates the correction path Rt to correct the orientational displacement, and when it detects both the positional displacement and the orientational displacement, it creates the correction path Rt to correct both the positional displacement and the orientational displacement.

For example, in the inner area Fa (see FIG. 5), when the positional displacement of the current position P0 is beyond a predetermined range with respect to the target start position p7 of the work path R2, and the orientational displacement is beyond a predetermined range with respect to the extension direction of the work path R2, the vehicle control apparatus 11 creates the correction path Rt including a reverse path (see FIG. 6A, FIG. 7, FIG. 8). In addition, for example, the vehicle control apparatus 11 sets positions (such as p11) to switch between reverse travel and forward travel so that the positional displacement and the orientational displacement fall within a predetermined range in straight travel toward the work path R2.

Moreover, in the headland area Fb (see FIG. 10), for example, when the positional displacement of the current position P0 is beyond a predetermined range with respect to the target start position p21 of the work path R22, and the orientational displacement is beyond a predetermined range with respect to the extension direction of the work path R2, the vehicle control apparatus 11 creates the correction path Rt including a reverse path (see FIG. 11).

Next, in Step S5, the vehicle control apparatus 11 causes the work vehicle 10 to automatically travel (correctively travel) along the correction path Rt.

Figure 6B:
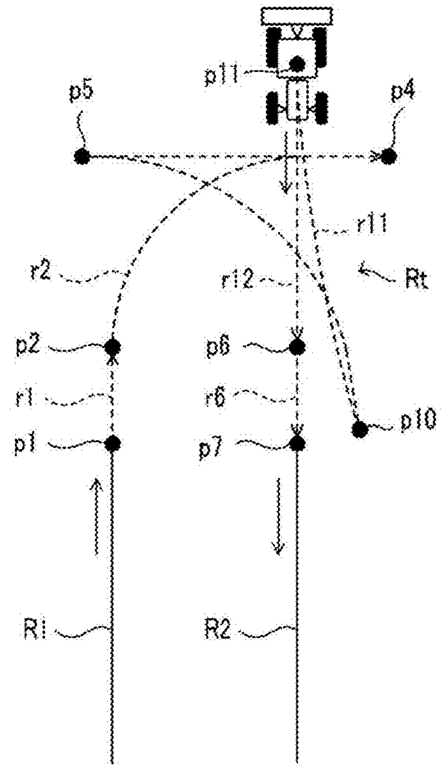
FIG. 6B is a view illustrating an example of correction travel according to the embodiment of the present invention.
Figure 7:
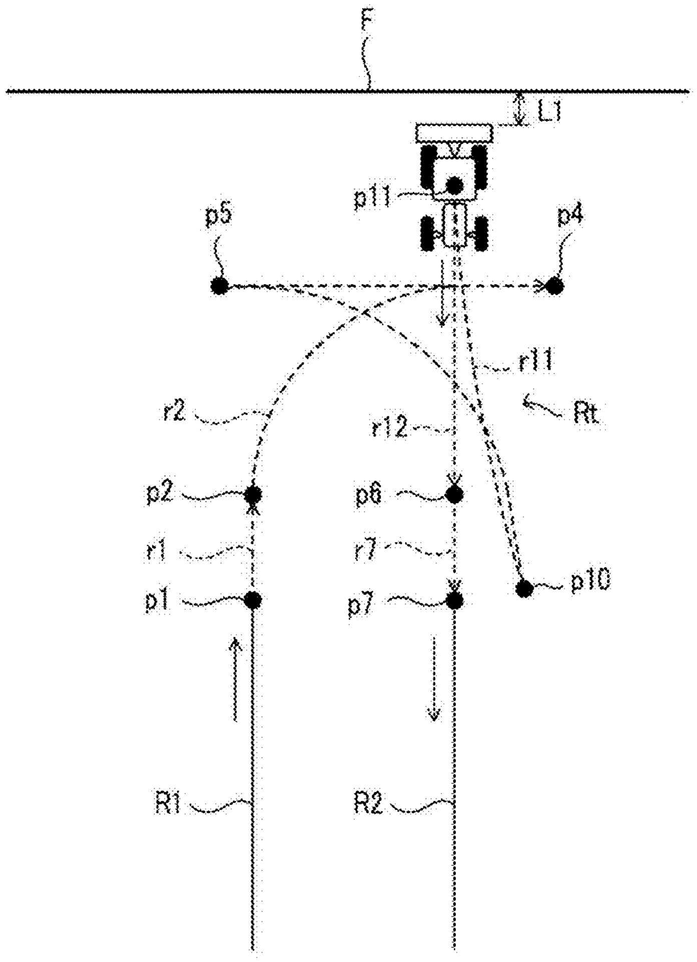
FIG. 7 is a view illustrating another example of correction travel according to the embodiment of the present invention.

For example, in an example shown in FIG. 6A and FIG. 6B, the vehicle control apparatus 11 causes the work vehicle 10 to turn and travel in the turning path r11 from the current position P0 (position p10) in the reverse direction, and when the work vehicle 10 arrives in a predetermined range (predetermined accuracy) from the position p11 or the position p11, it causes the work vehicle 10 to travel straight in the straight path r12 in the forward direction.

Further, in an example shown in FIG. 11, for example, the vehicle control apparatus 11 causes the work vehicle 10 to turn and travel in the turning path r31 from the current position P0 (position p30) in the reverse direction, and when the work vehicle 10 arrives at the position p31, it causes the work vehicle 10 to travel straight in the straight path r32 in the forward direction.

Next, in Step S6, the vehicle control apparatus 11 decides whether both the positional displacement and the orientational displacement of the work vehicle 10 are within a predetermined range respect to the target start position or not. When the vehicle control apparatus 11 decides that the displacement (positional displacement) of the work vehicle 10 is equal to or below a predetermined distance with respect to the target start position which is the starting end of the work path, and that the displacement (orientational displacement) of the vehicle orientation of the work vehicle 10 is equal to or below a predetermined orientation with respect to the extension direction of that work path in that target start position (S6: Yes), it moves the process to Step S7.

On the contrary, when the vehicle control apparatus 11 decides that the displacement (positional displacement) of the work vehicle 10 is beyond a predetermined distance with respect to the target start position which is the starting end of the work path, or that the displacement (orientational displacement) of the vehicle orientation of the work vehicle 10 is beyond a predetermined orientation with respect to the extension direction of that work path in that target start position (S6: No), it moves the process to Step S4. When the vehicle control apparatus 11 moves the process to Step S4, then it causes the work vehicle 10 to perform the correction travel again. For example, the vehicle control apparatus 11 creates the correction path Rt again to cause the work vehicle 10 to correctively travel (see FIG. 8).

The vehicle control apparatus 11 repeatedly perform the correction travel until both the positional displacement and the orientational displacement fall within a predetermined range (S6: No).

When both the positional displacement and the orientational displacement fall within a predetermined range, the vehicle control apparatus 11 decides whether the work vehicle 10 completes work or not, in Step S7. For example, when the work vehicle 10 arrives at the travel end position G (see FIG. 3), the vehicle control apparatus 11 decides that the work vehicle 10 has completed work (S7: Yes) and completes the automatic travel process. The vehicle control apparatus 11 repeatedly executes the above processes until the work vehicle 10 arrives at the travel end position G (S7: No). As described above, the vehicle control apparatus 11 executes the automatic travel process.

Meanwhile, when the vehicle control apparatus 11 previously creates the correction path Rt, it may create the correction path Rt which does not include a reverse path from the position of the positional displacement and the orientational displacement. For example, in an example shown in FIG. 5 and FIG. 6A, at the time before the work vehicle 10 turns and travels in the turning path r5, it may be difficult to previously identify the position p10 of the positional displacement. Because of this, when the vehicle control apparatus 11 previously creates the correction path Rt, it sets the position p11 in which reverse travel is switched to straight travel, and creates a path connecting the position p11 and the target start position p7 as the correction path Rt. Then, the vehicle control apparatus 11 determines whether or not to cause the work vehicle 10 travel in the correction path Rt based on a position at the time when the work vehicle turns and travels in the turning path r5. Thus, the correction path Rt may not include a reverse path from the position of the positional displacement and the orientational displacement.

As explained above, the automatic travel system 1 according to this embodiment is a system that causes the work vehicle 10 to automatically travel along the preset target path R. Moreover, the automatic travel system 1 causes the work vehicle 10 to travel along a plurality of work paths which are included in the target path R and which cause the work vehicle 10 to perform predetermined work and a plurality of turning paths which connect between the work paths. Further, in a case where the work vehicle 10 travels in the turning path, when it is decided that at least one of a predetermined positional displacement and a predetermined orientational displacement occurs with respect to a target start position of the work path which follows the turning path, the automatic travel system 1 causes the work vehicle 10 to perform correction travel including reverse travel.

For example, when it is decided that the positional displacement occurs, the automatic travel system 1 causes the work vehicle 10 to correctively travel so that the distance of the positional displacement is equal to or below a predetermined distance with respect to the target start position, and when it is decided that the orientational displacement occurs, the automatic travel system 1 causes the work vehicle 10 to correctively travel so that the orientational displacement is equal to or below a predetermined orientation with respect to the extension direction of the work path which follows the turning path.

According to the above arrangement, when the work vehicle 10 moves from the work path R1 to the next work path R2, for example, in a case where the work vehicle 10 cannot appropriately arrive at the starting end (target start position p7) of the work path R2 (see FIG. 5), travel is switched from automatic travel along the target path R to correction travel along the correction path Rt, and the positional displacement and the orientational displacement are corrected by reverse travel (see FIG. 6A and FIG. 6B). For example, the positional displacement and the orientational displacement can be easily corrected by setting the long reverse travel path, and by repeating forward and reverse travel in the reverse travel path. This allows the work vehicle 10 to appropriately enter the next work path R2, thereby allowing the work vehicle 10 to perform appropriate work from the starting end of the work path R2. Thus, according to the above arrangement of the present invention, it allows the work vehicle 10 to appropriately enter a work path which follows a turning path.

OTHER EMBODIMENTS

The present invention is not limited to the above embodiment. Other embodiments of the present invention will be described below.

When it is decided that the correction travel is required in each of the predetermined number of work paths, the vehicle control apparatus 11 may notify the worker of it. For example, in a case where correction travel is performed in each of the work paths R1 and R2, and it is decided that at least one of a predetermined positional displacement and a predetermined orientational displacement occurs also in a work path R3 that further follows, the vehicle control apparatus 11 sends to the operation terminal 20 a message indicating that correction travel is frequently performed. After the worker checks the message, he/she checks the state of the field, the positioning state of the positioning unit 16 in the work vehicle 10 and the like.

Moreover, as another embodiment of the present invention, the vehicle control apparatus 11 may adjust the travel speed during the correction travel. For example, when the work vehicle 10 correctively travels, the vehicle control apparatus 11 causes the work vehicle 10 to turn and travel at a slower speed than a turning speed of a preset reverse turn. The vehicle control apparatus 11 may set both turning travel and forward travel included in the correction travel at a low speed, or may set turning travel only at a low speed. Further, the vehicle control apparatus 11 may set the vehicle speed during correction travel depending on a displaced amount of the positional displacement (difference in distance) and a displaced amount of the orientational displacement (difference in orientation). For example, as the displaced amount becomes bigger, the vehicle speed during correction travel may be slowed down. Adjusting the vehicle speed in correction travel facilitates correcting the positional displacement and the orientational displacement.

In addition, as another embodiment of the present invention, the vehicle control apparatus 11 may adjust the turn radius in the correction travel. For example, when the work vehicle 10 correctively travels, the vehicle control apparatus 11 causes the work vehicle 10 to turn and travel in a smaller radius than that in a preset turn. Moreover, the vehicle control apparatus 11 may set the turn radius in correction travel depending on a displaced amount of the positional displacement (difference in distance) and a displaced amount of the orientational displacement (difference in orientation). For example, as the displaced amount becomes bigger, the turn radius may be reduced in the correction travel. Adjusting the turn radius in correction travel facilitates correcting the positional displacement and the orientational displacement, and can also reduce the correction path.

In the above embodiment, in a case where the headland area Fb is narrow and the positional displacement and the orientational displacement do not fall within a predetermined range at one-time correction travel, for example, the correction process part 112 comprises a structure which can repeatedly perform the correction travel multiple times (see FIG. 8). However, because of the bad condition of the field F or the low positional accuracy, it is also supposed that even if the correction travel is performed multiple times, the positional displacement and the orientational displacement do not fall within a predetermined range.

When the correction travel is repeated unnecessarily multiple times, problems of the rough field and the reduced work efficiency also arise.

Figure 14:
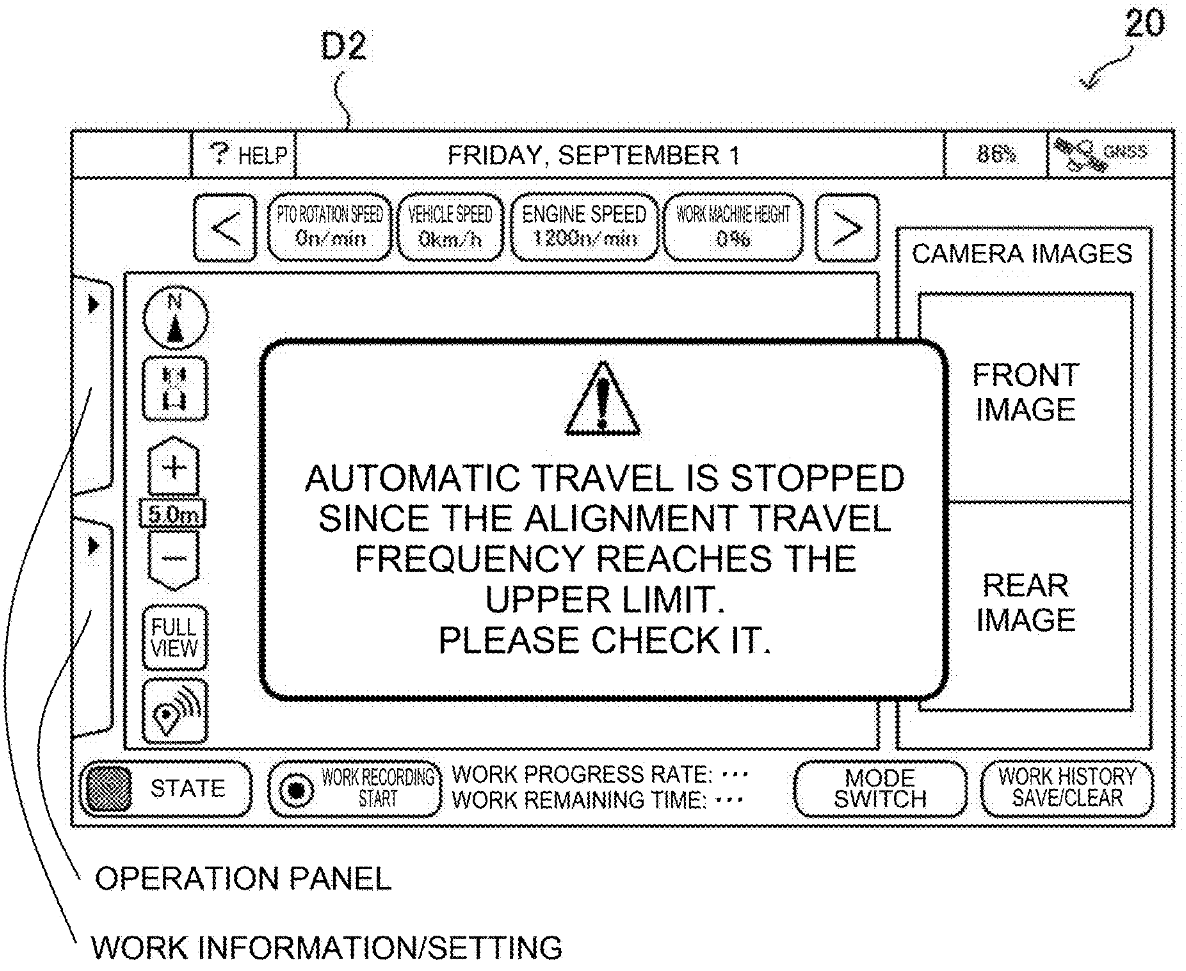
FIG. 14 is a view illustrating an example of a travel screen displayed on the operation terminal according to the embodiment of the present invention.

For this reason, as another embodiment, the upper limit number of times of the correctional travel may be preset. For example, the worker sets the upper limit upper limit number of times of the correctional travel on the setting screen (not shown) in the operation terminal 20. When the upper limit number of times is set, the vehicle control apparatus 11 stops the correction travel at the time when the number of times of the correction travel reaches the upper limit number of times, and informs the worker of it. For example, as shown in FIG. 14, when the number of times of the correction travel reaches the upper limit number of times, the vehicle control apparatus 11 stops automatic travel, and sends to and displays on the operation terminal 20 a message that automatic travel is stopped ("Automatic travel is stopped since the alignment travel number of times reaches the upper limit. Please check it."). The operation control part 21 of the operation terminal 20 displays the message on a travel screen D2 which displays the travel situation. When the worker checks the message, he/she goes to the place where the work vehicle 10 has stopped and checks the state of the field, or switches automatic travel to manual travel. For example, the worker switches automatic travel to manual travel, moves the work vehicle 10 to the starting end of the next work path, and resumes automatic travel.

In addition, as another embodiment, in a case where at least one of the positional displacement and the orientational displacement occurs with respect to the target start position at the time when the number of times of the correction travel reaches the upper limit number of times, the vehicle control apparatus 11 may cause the work vehicle 10 to perform a specific process different from the correction travel.

The specific process is a process for reducing (narrowing) the inner area Fa, for example. For example, in a case where an area for performing the correction travel cannot be secured adequately because of the narrow preset headland area Fb, and the number of times of the correction travel reaches the upper limit number of times, the vehicle control apparatus 11 performs a process for narrowing the inner area Fa to expand the headland area Fb. As a result of this, when the positional displacement and the orientational displacement occur, for example, the work vehicle can correct the positional displacement and the orientational displacement with the low correction travel frequency. Meanwhile, a change (reduction) in the range of the inner area Fa by the vehicle control apparatus 11 may be conditioned on permission from the worker. The vehicle control apparatus 11 performs the correction travel by narrowing the inner area Fa when the worker permits it, and the vehicle control apparatus 11 stops the correction travel without changing the inner area Fa when the worker refuses it.

Figure 15:
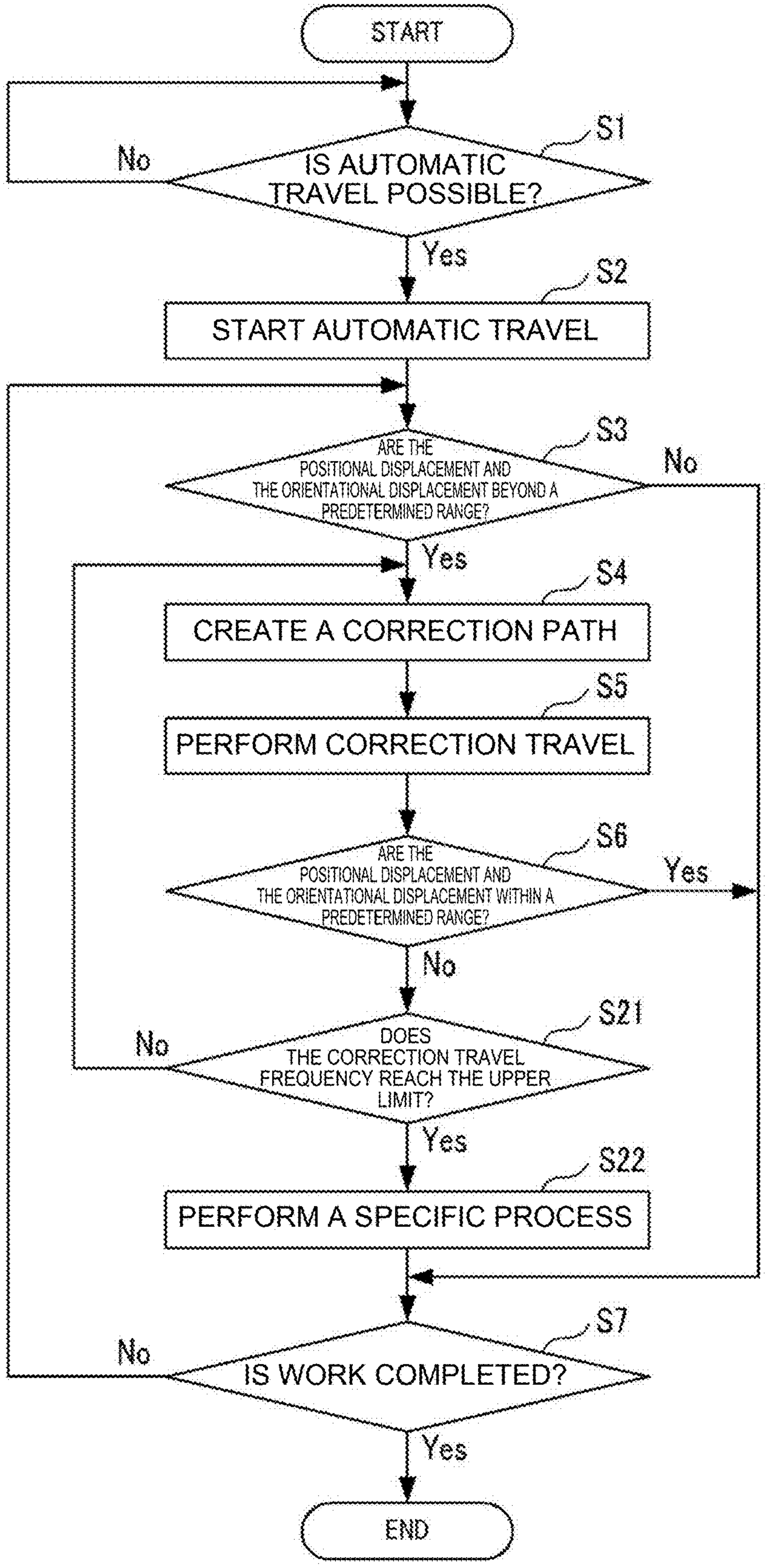
FIG. 15 is a flowchart illustrating another example of the procedure of the automatic travel process executed by the automatic travel system according to the embodiment of the present invention.

In FIG. 15, an example of the automatic travel process comprising a function to perform the specific process is shown.

Figure 13:
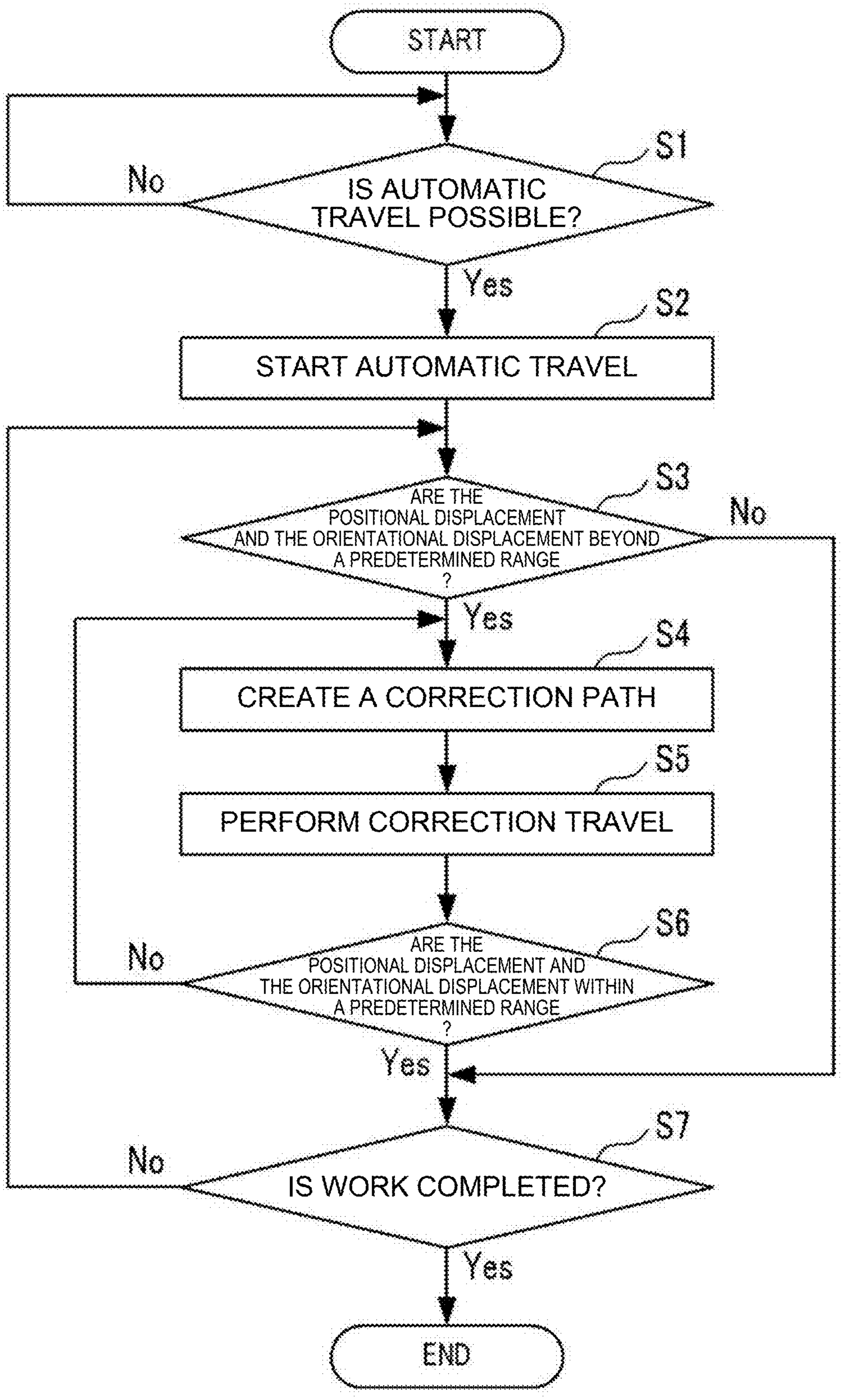
FIG. 13 is a flowchart illustrating an example of a procedure of an automatic travel process executed by the automatic travel system according to the embodiment of the present invention.

In FIG. 15, Steps S1-S7 are identical with Steps S1-S7 in FIG. 13, and Steps S21 and S22 are added.

In particular, when it is decided that a displacement (positional displacement) of the work vehicle 10 is beyond a predetermined range with respect to the target start position which is the starting end of a work path, or that a displacement (orientational displacement) of the vehicle orientation of the work vehicle 10 is beyond a predetermined range with respect to the extension direction of the work path in that target start position (S6: No), the vehicle control apparatus 11 decides whether the number of times of the correction travel reaches the upper limit number of times or not, in Step S21. When the vehicle control apparatus 11 decides that the number of times of the correction travel reaches the upper limit number of times (S21: Yes), it moves the process to Step S22. On the other hand, when the vehicle control apparatus 11 decides that the number of times of the correction travel does not reach the upper limit number of times (S21: No), it moves the process to Step S4 and causes the work vehicle 10 to perform the correction travel again. When the positional displacement and the orientational displacement do not fall within a predetermined range (S6: No), the vehicle control apparatus 11 performs the correction travel repeatedly until the number of times of the correction travel reaches the upper limit number of times (S21: No).

In Step S22, the vehicle control apparatus 11 causes the work vehicle 10 to perform the specific process. For example, the vehicle control apparatus 11 performs a process for narrowing the inner area Fa to expand the headland area Fb. When the vehicle control apparatus 11 performs the specific process, it moves the process to Step S7. When work is continued after the specific process (S7: No), the vehicle control apparatus 11 performs, in the narrowed inner area Fa, the decision process (S3), the correction processes (S4, S5) for the positional displacement and the orientational displacement, etc.

According to the above arrangement, when correction travel is performed while the size of the work area is dynamically changed, automatic travel and work can be performed while the positional displacement and the orientational displacement are corrected.

Here, the work vehicle 10 may perform a plurality of different work in the same field F. For example, the work vehicle 10 may perform cultivating work (first work), followed by ridging work (second work), or may perform ridging work (first work), followed by seeding work and transplanting work (second work) in the field F. Thus, when first work and second work are performed by the work vehicle 10 in the field F, the vehicle control apparatus 11 may cause the work vehicle 10 to perform second work based on information about the specific process. For example, when the inner area Fa is narrowed at first work, the vehicle control apparatus 11 causes the work vehicle 10 to perform, at second work, automatic travel, work, correction travel or the like with respect to the inner area Fa which has been narrowed at first work.

Also, as another embodiment, the vehicle control apparatus 11 may omit the second work at an area positioned outside a work area where the work area of the first work is reduced. For example, when the work vehicle 10 performs seeding work in the area where the inner area Fa is narrowed after performing ridging work, the vehicle control apparatus 11 causes the work vehicle 10 to perform seeding work while the ridged and worked area is ignored in the area outside of the narrowed inner area Fa.

This case means that seeding and transplanting are not provided in a ridged portion positioned outside the inner area Fa. Meanwhile, when trample on ridges positioned outside the inner area Fa has no effect, ridges positioned outside the inner area Fa may be trampled at later work. In addition, seeding and transplanting may be settable at ridges positioned outside the narrowed inner area Fa.

Further, in a portion where the work position of earlier work (first work) and the scheduled work position of later work (second work) do not overlap, the work vehicle 10 may perform work in later work while the non-overlapping portion is disregarded.

Moreover, as another embodiment of the present invention, information about correction travel may be associated and registered with a place in the field. For example, the vehicle control apparatus 11 associates and registers the correction path Rt (see FIG. 6A and FIG. 6B) with the headland area Fb (two opposing sides) of the field F, and associates and registers the correction path Rt (see FIG. 11) with corner parts (four corners) of the field F. In this case, the vehicle control apparatus 11 may cause the work vehicle 10 to perform correction travel based on previously registered information about the correction path Rt.

Meanwhile, in order for the work vehicle 10 to appropriately enter the work path, the positional displacement and the orientational displacement need to be within a predetermined range (permissible range) in a predetermined position frontward of the target start position. In other words, as long as the positional displacement and the orientational displacement are within a predetermined range at least in the predetermined position, the work vehicle 10 can appropriately enter the work path (straight, for example). Namely, the above predetermined position is considered a deadline (decision position of interest) when it is decided whether the work vehicle 10 can appropriately enter the work path or not. Because of this, the vehicle control apparatus 11 executes the decision process when the work vehicle 10 actually arrives at the decision position of interest, or executes the decision process on the assumption that the work vehicle 10 has arrived at the decision position of interest.

Here, the distance to the target start position may vary due to the type of the work vehicle 10, the type of the work machine 14, the position where the work machine 14 is attached, etc. For example, in a case where the work machine 14 is attached in front of the work vehicle 10 (such as the case of a combine harvester), the distance from the work machine 14 to the target start position is shorter, as compared with that in a case where the work machine 14 is attached in the rear of the work vehicle 10 (such as the case of a tractor and a rice transplanter). As the distance from the work machine 14 to the target start position becomes shorter, correction of the positional displacement and the orientational displacement becomes difficult.

Therefore, the vehicle control apparatus 11 may comprise a structure that sets the decision position of interest depending on the position where the work machine 14 is attached, the type of the work machine 14, the type of the work vehicle 10, etc. For example, in a case where the work machine 14 is attached in front of the work vehicle 10, the vehicle control apparatus 11 set the decision position of interest in a further forward position (in a position further remote from the target start position), as compared with a case where the work machine 14 is attached in the rear of the work vehicle 10. This allows the work vehicle to appropriately enter the work path regardless of the position where the work machine 14 is attached, the type of the work machine 14 and the type of the work vehicle 10.

[Supplementary Notes of the Invention]

Hereinafter, a summary of the invention extracted from the above embodiments will be described. Meanwhile, each structure and each processing function described in the following supplementary notes can be selected and arbitrarily combined.

<Supplementary Note 1>

An automatic travel method for causing a work vehicle to automatically travel along a preset target path, wherein the automatic travel method performs:

causing the work vehicle to travel along a plurality of work paths which cause the work vehicle to perform predetermined work, and a plurality of turning paths connecting the work paths, the work paths and the turning paths being included in the target path; and in a case where the work vehicle travels in the turning path, when it is decided that at least one of a predetermined positional displacement and a predetermined orientational displacement occurs with respect to a target start position of the work path which follows the turning path, causing the work vehicle to perform correction travel including reverse travel.

<Supplementary Note 2>

The automatic travel method according to supplementary note 1, wherein when it is decided that the positional displacement occurs, the work vehicle correctively travels so that a distance of the positional displacement is equal to or below a predetermined distance with respect to the target start position, and when it is decided that the orientational displacement occurs, the work vehicle correctively travels so that the orientational displacement is equal to or below a predetermined orientation with respect to an extension direction of the work path which follows the turning path.

<Supplementary Note 3>

The automatic travel method according to supplementary note 2, wherein after the work vehicle correctively travels, the work vehicle travels forward toward the target start position in a straight advancing direction.

<Supplementary Note 4>

The automatic travel method according to any one of supplementary notes 1-3, wherein when it is decided that at least one of the positional displacement and the orientational displacement occurs, a correction path which is different form the target path is created, and the work vehicle correctively travels along the correction path.

<Supplementary Note 5>

The automatic travel method according to any one of supplementary notes 1-4, wherein upper limit number of times the work vehicle correctively travels can be preset.

<Supplementary Note 6>

The automatic travel method according to supplementary note 5, wherein in a case where the positional displacement and the orientational displacement do not fall within a predetermined range at a time when the number of times the work vehicle correctively travels reaches the upper limit number of times, a specific process which is different from the correction travel is performed.

<Supplementary Note 7>

The automatic travel method according to supplementary note 6, wherein the specific process is a process for reducing a work area located inside an area where the turning path is set.

<Supplementary Note 8>

The automatic travel method according to supplementary note 6 or 7, wherein when first work and second work which follows the first work are performed by the work vehicle in a work area, the second work is performed by the work vehicle based on information about the specific process.

<Supplementary Note 9>

The automatic travel method according to supplementary note 7, wherein when first work and second work which follows the first work are performed by the work vehicle in a work area, the second work is omitted at an area positioned outside a work area where a work area of the first work is reduced.

<Supplementary Note 10>

The automatic travel method according to supplementary note 4, wherein in a case where the positional displacement and the orientational displacement fall within a predetermined range in halfway through the correction path when the work vehicle correctively travels along the correction path, the correction travel is ended, and the work vehicle travels forward toward the target start position in the straight advancing direction.

REFERENCE SIGNS LIST

1 automatic travel system
work vehicle
11 vehicle control apparatus
12 storage part
13 travel apparatus
14 work machine
15 communication part
16 positioning unit
20 operation terminal
21 operation control part
22 storage part
23 operation display part
24 communication part
111 travel process part
112 correction process part
F field
Fa inner area
Fb headland area
R target path
R1 work path
R2 work path
Ra inner work path
Rb headland work path
Rs1 turning path
Rs2 turning path
Rt correction path
p7 target start position
p21 target start position

The invention claimed is:

1. An automatic travel method for causing a work vehicle to automatically travel along a preset target path, wherein the automatic travel method performs:

causing the work vehicle to travel along a plurality of work paths which cause the work vehicle to perform predetermined work, and a plurality of turning paths connecting the work paths, the work paths and the turning paths being included in the target path; and in a case where the work vehicle travels in a current turning path, when it is decided that at least one of a predetermined positional displacement and a predetermined orientational displacement occurs with respect to a target start position of the work path which follows the current turning path, causing the work vehicle to perform correction travel including reverse travel, and when a plurality of times the work vehicle correctively travels reaches an upper limit number of times, a work area located inside an area where the current turning path is set is reduced.

2. The automatic travel method according to claim 1, wherein when it is decided that the positional displacement occurs, the work vehicle correctively travels so that a distance of the positional displacement is equal to or below a predetermined distance with respect to the target start position, and when it is decided that the orientational displacement occurs, the work vehicle correctively travels so that the orientational displacement is equal to or below a predetermined orientation with respect to an extension direction of the work path which follows the current turning path.

3. The automatic travel method according to claim 2, wherein after the work vehicle correctively travels, the work vehicle travels forward toward the target start position in a straight advancing direction.

4. The automatic travel method according to claim 1, wherein when it is decided that at least one of the positional displacement and the orientational displacement occurs, a correction path which is different from the target path is created, and the work vehicle correctively travels along the correction path.

5. The automatic travel method according to claim 4, wherein in a case where the positional displacement and the orientational displacement fall within a predetermined range in halfway through the correction path when the work vehicle correctively travels along the correction path, the correction travel is ended, and the work vehicle travels forward toward the target start position in the straight advancing direction.

6. The automatic travel method according to claim 1, wherein the upper limit number of times the work vehicle correctively travels can be preset.

7. The automatic travel method according to claim 6, wherein in a case where the positional displacement and the orientational displacement do not fall within a predetermined range at a time when the number of times the work vehicle correctively travels reaches the upper limit number of times, a specific process which is different from the correction travel is performed.

8. The automatic travel method according to claim 7, wherein the specific process is a process for reducing the work area located inside the area where the current turning path is set.

9. The automatic travel method according to claim 8, wherein when first work and second work, which follows the first work, are performed by the work vehicle in the work area, the second work is omitted at an area positioned outside the work area where the work area of the first work is reduced.

10. The automatic travel method according to claim 7, wherein when first work and second work, which follows the first work, are performed by the work vehicle in the work area, the second work is performed by the work vehicle based on information about the specific process.

11. A non-volatile computer-readable medium for storing an automatic travel program for causing a work vehicle to automatically travel along a preset target path, the automatic travel program causing one or more processors to:

cause the work vehicle to travel along a plurality of work paths which causing the work vehicle to perform predetermined work, and a plurality of turning paths connecting the plurality of work paths, the work paths and the turning paths being included in the target path; and in a case where the work vehicle travels in a current turning path, when it is decided that at least one of a predetermined positional displacement and a predetermined orientational displacement occurs with respect to a target start position of the work path which follows the current turning path, cause the work vehicle to perform correction travel including reverse travel, and when a plurality of times the work vehicle correctively travels reaches an upper limit number of times, a work area located inside an area where the current turning path is set is reduced.

12. An automatic travel system for causing a work vehicle to automatically travel along a preset target path, the automatic travel system comprising:

a travel process part which causes the work vehicle to travel along a plurality of work paths which cause the work vehicle to perform predetermined work, and a plurality of turning paths connecting the work paths, the work paths and the turning paths being included in the target path; and a correction process part which, in a case where the work vehicle travels in a current turning path, when it is decided that at least one of a predetermined positional displacement and a predetermined orientational displacement occurs with respect to a target start position of the work path which follows the current turning path, causes the work vehicle to perform correction travel including reverse travel, and when a plurality of times the work vehicle correctively travels reaches an upper limit number of times, a work area located inside an area where the current turning path is set is reduced.

* * * * *